US010885131B2

(12) United States Patent
Bagheri et al.

(10) Patent No.: US 10,885,131 B2
(45) Date of Patent: Jan. 5, 2021

(54) SYSTEM AND METHOD FOR TEMPORAL IDENTIFICATION OF LATENT USER COMMUNITIES USING ELECTRONIC CONTENT

(71) Applicants: Ebrahim Bagheri, Toronto (CA); Hossein Fani, Toronto (CA); Fattane Zarrinkalam, Toronto (CA)

(72) Inventors: Ebrahim Bagheri, Toronto (CA); Hossein Fani, Toronto (CA); Fattane Zarrinkalam, Toronto (CA)

( * ) Notice: Subject to any disclaimer, the term of this patent is extended or adjusted under 35 U.S.C. 154(b) by 977 days.

(21) Appl. No.: 15/262,246

(22) Filed: Sep. 12, 2016

(65) Prior Publication Data

US 2018/0075147 A1      Mar. 15, 2018

(51) Int. Cl.
*G06F 16/9535* (2019.01)
*G06Q 30/02* (2012.01)
*G06Q 50/00* (2012.01)

(52) U.S. Cl.
CPC ..... *G06F 16/9535* (2019.01); *G06Q 30/0269* (2013.01); *G06Q 50/01* (2013.01)

(58) Field of Classification Search
CPC .......................... G06F 16/9535; G06F 16/335
See application file for complete search history.

(56) References Cited

U.S. PATENT DOCUMENTS

| | | | |
|---|---|---|---|
| 7,536,413 B1 * | 5/2009 | Mohan | G06F 16/335 |
| 8,090,665 B2 | 1/2012 | Yang et al. | |
| 8,346,708 B2 | 1/2013 | Chi et al. | |
| 8,396,855 B2 | 3/2013 | Aggarwal et al. | |
| 8,516,374 B2 | 8/2013 | Fleischman et al. | |

(Continued)

FOREIGN PATENT DOCUMENTS

| | | |
|---|---|---|
| CN | 101916256 A | 12/2010 |
| CN | 105373591 A | 3/2016 |

(Continued)

OTHER PUBLICATIONS

Cataldi et al. ("merging Topic Detection on Twitter based on Temporal and Social Terms Evaluation"; Published in: Proceeding MDMKDD '10; Proceedings of the Tenth International Workshop on Multimedia Data Mining; Article No. 4; Washington, D.C.—Jul. 25-25, 2010; (Year: 2010).*

(Continued)

*Primary Examiner* — Ken Hoang
(74) *Attorney, Agent, or Firm* — Bereskin & Parr LLP/S.E.N.C.R.L., s.r.l.; Tony Orsi

(57) ABSTRACT

Various embodiments are described herein for a system and method for determining a community of users with similar temporal behaviour from a plurality of users that generate electronic content during a time period by, for example, accessing the electronic content from a data store using a processing unit; determining at least one transient topic from the accessed electronic content for the time period using a topic extractor; determining contributions of the users to the identified at least one transient topic using a user community detector; determining the community of users as the users that have similar temporal contributions to the at least one identified transient topic using the user community detector; and providing a recommendation based on a determined user community.

19 Claims, 10 Drawing Sheets

(56) References Cited

U.S. PATENT DOCUMENTS

| | | | |
|---|---|---|---|
| 8,713,022 | B2 | 4/2014 | Jin et al. |
| 8,725,717 | B2 | 5/2014 | Bernstein et al. |
| 8,738,695 | B2 | 5/2014 | Smith et al. |
| 8,738,697 | B2 | 5/2014 | Park et al. |
| 8,793,312 | B2* | 7/2014 | Tao ................... G06Q 30/0251 709/204 |
| 8,914,371 | B2 | 12/2014 | Aggarwal et al. |
| 9,104,667 | B2 | 8/2015 | Codella et al. |
| 9,177,254 | B2 | 11/2015 | Buddhu et al. |
| 9,317,887 | B2 | 4/2016 | Lee et al. |
| 2003/0033333 | A1 | 2/2003 | Nishino et al. |
| 2006/0282303 | A1* | 12/2006 | Hale ..................... G06F 16/36 705/7.11 |
| 2008/0288596 | A1 | 11/2008 | Smith et al. |
| 2010/0185935 | A1 | 7/2010 | Yang et al. |
| 2011/0041080 | A1 | 2/2011 | Fleischman et al. |
| 2013/0151522 | A1 | 6/2013 | Aggarwal et al. |
| 2016/0188704 | A1 | 6/2016 | Dassa et al. |
| 2016/0188713 | A1 | 6/2016 | Green |
| 2016/0189171 | A1* | 6/2016 | Bingham ........... G06Q 30/0201 705/7.29 |
| 2016/0239581 | A1 | 8/2016 | Jaidka et al. |
| 2016/0253688 | A1 | 9/2016 | Nielsen et al. |
| 2016/0299975 | A1* | 10/2016 | Acar ..................... G06N 5/022 |
| 2016/0343027 | A1* | 11/2016 | Cheng ............... G06Q 30/0254 |
| 2016/0344828 | A1* | 11/2016 | Hausler .................. H04L 67/42 |
| 2017/0206276 | A1* | 7/2017 | Gill ..................... G06F 16/9535 |
| 2017/0228445 | A1* | 8/2017 | Chiu ....................... G06F 16/25 |

FOREIGN PATENT DOCUMENTS

| | | |
|---|---|---|
| CN | 105550211 A | 5/2016 |
| CN | 105589935 A | 5/2016 |
| CN | 105740448 A | 7/2016 |
| JP | 5974663 B2 | 7/2016 |
| KR | 10-1624680 B1 | 5/2016 |
| KR | 10-1650993 B1 | 8/2016 |

OTHER PUBLICATIONS

Liu et al. ("Building Semantic Perceptron Net for Topic Spotting"; ACL '01: Proceedings of the 39th Annual Meeting on Association for Computational Linguistics Jul. 2001 pp. 378-385; https://doi.org/10.3115/1073012.1073061) (Year: 2001).*

Abel, et al., "Analyzing user modeling on Twitter for personalized news recommendations", In UMAP 2011, pp. 1-12.

Blondel, et al., "Fast unfolding of communities in large networks", J. Statistical Mechanics: Theory and Experiment, 2008, pp. 1-12.

Blei, et al., "Latent dirichlet allocation", Journal of Machine Learning Research, 2003, 3:993-1022.

Hong, et al., "Empirical study of topic modeling in Twitter", In Proceedings of the First Workshop on Social Media Analytics, SOMA 2010, ACM, New York, NY, USA, pp. 80-88.

Weng, et al., "Twitterrank: Finding Topic-Sensitive Influential Twitterers", Proceedings of the Third ACM International Conference on Web Search & Data Mining, 2010, New York, pp. 261-270.

Deng, et al., "Interaction-based social relationship type identification in microblog", International Workshop on Behavior and Social Informatics and Computing, 2013, 151-164.

Ding, "Community detection: Topological vs. topical", J. Informetrics, 2011, 5(4): 498-514.

Ferragina, et al., "Fast and accurate annotation of short texts with Wikipedia pages", J. IEEE Software, 2012, 29(1): 10-75.

Varga, et al., "Linked knowledge sources for topic classification of microposts: a semantic graph-based approach", J. Web Semantics: Science, Services and Agents on the World Wide Web, 2014, 26:36-57.

Zarrinkalam, et al., "Semantics-enabled user interest detection from Twitter", IEEE/WIC/ACM International Conference on Web Intelligence and Intelligent Agent Technology, 2015, pp. 469-476.

Cataldi, et al., "Emerging topic detection on Twitter based on temporal and social terms evaluation", Article No. 4, In Proceedings of the Tenth International Workshop on Multimedia Data Mining, MDMKDD 2010, ACM, New York, NY, USA, 10 pages.

Long, et al., "Towards effective event detection, tracking and summarization on microblog data", In Proceedings of the 12th international conference on Web-age information management, WAIM 2011, LNCS 6897, Springer-Verlag, Berlin, Heidelberg, Germany, pp. 652-663.

Petkos, et al., "A soft frequent pattern mining approach for textual topic detection", Article 25, In Proceedings of the 4th International Conference on Web Intelligence, Mining and Semantics, WIMS 2014, ACM, New York, NY, USA, 10 pages.

Cornolti, et al., "A framework for benchmarking entity-annotation systems", In Proceedings of the 22nd International conference on World Wide Web, WWW 2013, ACM, New York, NY, USA, pp. 249-260.

Weng, et al., "Event detection in Twitter", Proceedings of the Fifth International AAAI Conference on Weblogs and Social Media, 2011, pp. 401-408.

Wang, et al., "Topics over time: a non-markov continuous-time model of topical trends", In Proceedings of the 12th ACM SIGKDD international conference on Knowledge discovery and data mining, KDD 2006, ACM, New York, NY, USA, pp. 424-433.

Abdelbary, et al., "Utilizing deep learning for content-based community detection", Science and Information Conference, London, UK, 2014, pp. 777-784.

Aiello, et al., "Sensing trending topics on Twitter", IEEE Transactions on Multimedia, 2013, 15(6): 1268-1282.

Blei, "Probabilistic Topic Models", Communications of the ACM, 2012, 55(4): 77-84.

Cordeiro, "Twitter event detection: Combining wavelet analysis and topic inference summarization", Doctoral Symposium on Informatics Engineering, 2012, 16 pages.

Dong, et al., "Multiscale event detection in social media", J Data Min Knowl Disc, 2015, 29(5): 1374-1405.

Fortunato, Community detection in graphs, Physics Reports, 2010, 486(3-5): 75-174.

Hu, et al., "User group oriented temporal dynamics exploration", In Proceedings of the Twenty-Eighth AAAI Conference on Artificial Intelligence, AAAI 2014, AAAI Press, pp. 66-72.

Natarajan, et al., "Community detection in content-sharing social networks", In Proceedings of the 2013 IEEE/ACM International Conference on Advances in Social Networks Analysis and Mining, ASONAM 2013, ACM, New York NY, USA, pp. 82-89.

Phuvipadawat, et al., "Breaking news detection and tracking in Twitter", In Proceedings of the 2010 IEEE/WIC/ACM International Conference on Web Intelligence and Intelligent Agent Technology—vol. 03, WI-IAT 2010, IEEE Computer Society Washington, DC, USA, pp. 120-123.

Rosen-Zvi, et al., "The author-topic model for authors and documents", In Proceedings of the 20th conference on Uncertainty in artificial intelligence, UAI 2004, AUAI Press, Arlington, Virginia, USA, pp. 487-494.

Sachan, et al., "Using content and interactions for discovering communities in social networks", In Proceedings of the 21st international conference on World Wide Web, WWW 2012, ACM, New York, NY, USA, pp. 331-340.

Xueqi, et al., "BTM: Topic modeling over short texts", IEEE Transactions on Knowledge and Data Engineering, 2014, 26(12): 2928-2941.

Xuerui, et al., "Topics over time: a non-markov continuous-time model of topical trends", In Proceedings of the 12th ACM SIGKDD international conference on Knowledge discovery and data mining, KDD 2006, ACM, New York, NY, USA, pp. 424-433.

Yin, et al., "Latent community topic analysis: Integration of community discovery with topic modeling", TIST, Article No. 63, 2012, 3(4):63:1-63:21.

Zhou et al., "Probabilistic models for discovering e-communities", In Proceedings of the 15th international conference on World Wide Web, WWW 2006, ACM, New York, NY, USA, pp. 173-182.

(56) References Cited

OTHER PUBLICATIONS

Duan, et al., "Community detection in graphs through correction", In Proceedings of the 20th ACM SIGKDD International Conference on Knowledge Discovery and Data Mining, KDD 2014, ACM, New York, NY, USA, pp. 1376-1385.

Liu, et al. "Community detection based on topic distance in social tagging networks", TELKOMNIKA Indonesian Journal of Electrical Engineering, 2014, 12(5):4038-4049.

Mehrotra, et al., "Improving LDA topic models for microblogs via tweet pooling and automatic labeling", In Proceedings of the 36th international ACM SIGIR conference on Research and development in information retrieval, SIGIR 2013, ACM, New York, NY, USA, pp. 889-892.

Peng, et al., "DICH: A framework for discovering implicit communities hidden in tweets", World Wide Web, 2015, 18(4):795-818.

Rotta, et al., "Multilevel local search algorithms for modularity clustering", Journal of Experimental Algorithmics, 2011, Article No. 2.3, vol. 16, ACM, New York, NY, USA, pp. 1-27.

Sriram, et al., "Short text classification in Twitter to improve information filtering", In Proceedings of the 33rd International ACM SIGIR Conference on Research and Development in Information Retrieval, SIGIR 2010, ACM, New York, NY, USA, pp. 841-842.

\* cited by examiner

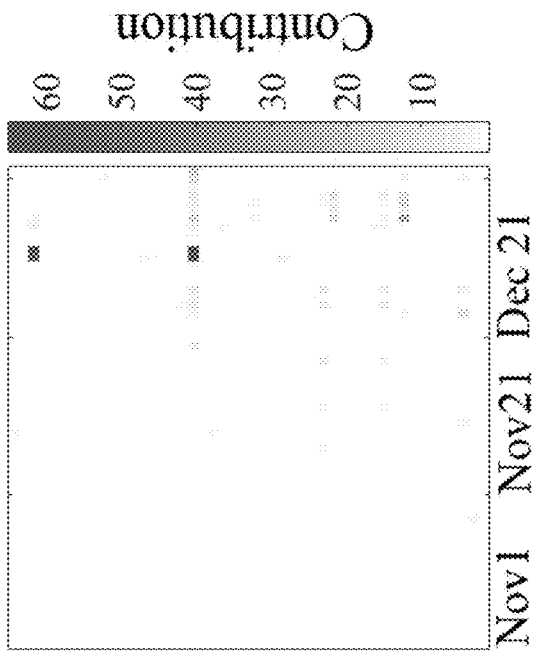
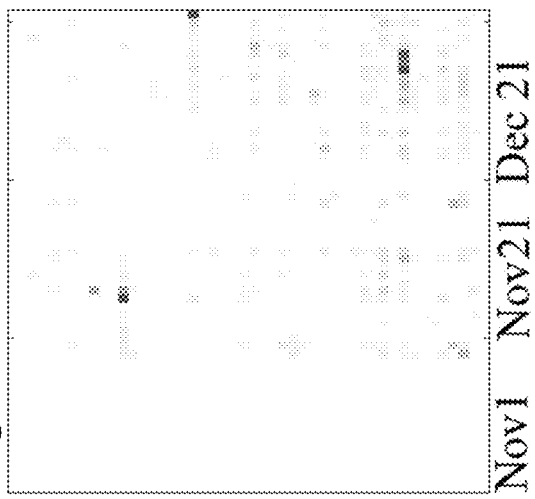
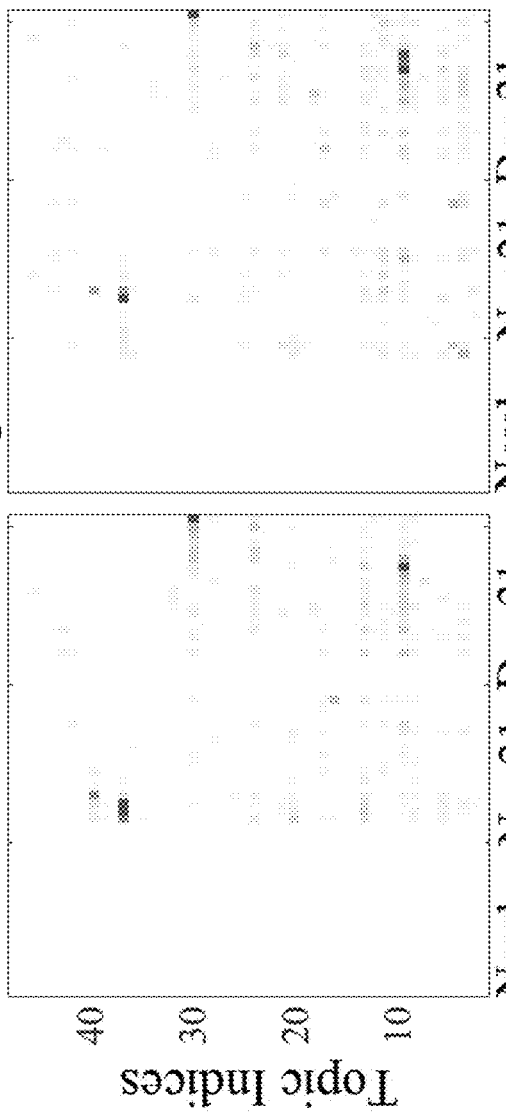
FIG. 6A  FIG. 6B  FIG. 6C
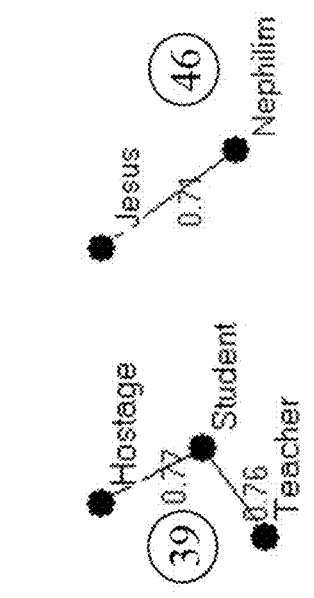
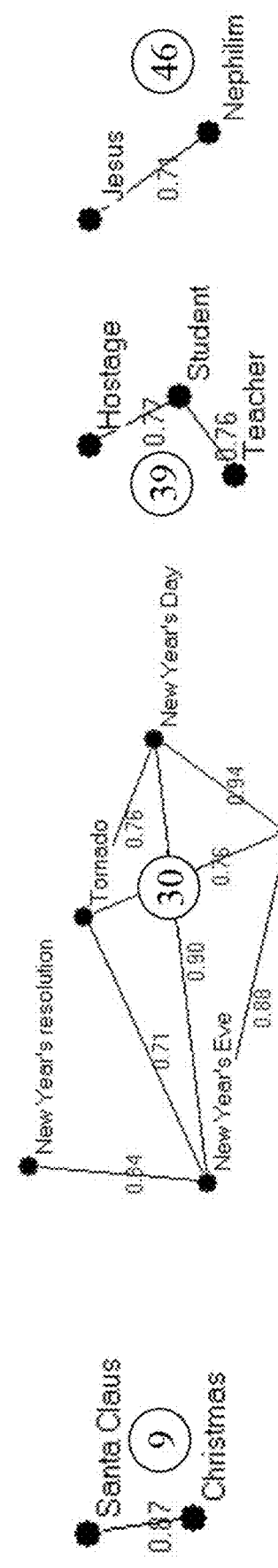
FIG. 6D  FIG. 6E  FIG. 6F  FIG. 6G $z_3$) Don't Ask, Don't Tell Repeal Act $z_{10}$) Russia & Qatar for the 2018 and 2022 FIFA World Cups $z_{11}$) The US diplomatic cables leaks by WikiLeaks $z_{17}$) Julian Assange bail $z_{24}$) North American blizzard $z_{36}$) Prince William's engagement $z_{37}$) Thanksgiving

SYSTEM AND METHOD FOR TEMPORAL IDENTIFICATION OF LATENT USER COMMUNITIES USING ELECTRONIC CONTENT

FIELD

Various embodiments are described herein for a system and method for determining groups of users that may be temporally related to one another through electronic content generated by the users.

BACKGROUND

Topology-based community detection methods may not be able to identify communities of users that share similar conceptual interests due to two reasons, among others: i) there are many users on a social network that have very similar interests but are not explicitly connected to each other, e.g. through follower or followee relationships; and ii) many of the social connections are not necessarily due to users' interest similarity but can be due to other factors such as friendship and kinship that do not necessarily point to inter-user interest similarity (Deng et al. 2013).

SUMMARY OF VARIOUS EMBODIMENTS

In a broad aspect, at least one embodiment described herein provides a method for determining a community of users with similar temporal behaviour from a plurality of users that generate electronic content that is stored in a data store, wherein the method comprises: accessing electronic content from the data store using a processing unit, the electronic content being created by the users during a time period; determining at least one transient topic from the accessed electronic content for the time period using a topic extractor; determining contributions of the users to the identified at least one transient topic using a user community detector; determining the community of users as being a subset of the users that have similar temporal contributions to one of the at least one identified transient topics using the user community detector; and providing a recommendation based on a determined user community.

In at least some embodiments, the act of determining the at least one transient topic for the time period comprises modelling each transient topic as a collection of highly correlated semantic concepts or keywords observed in the accessed user generated electronic content.

In at least some embodiments, the act of determining the at least one transient topic for the time period comprises annotating the accessed electronic content with at least one semantic concept using a semantic annotator or extracting at least one keyword; generating a concept signal for each at least one semantic concept or at least one keyword by determining the number of times a particular semantic concept or keyword has been observed for discrete time intervals in the time period; determining correlated semantic concepts or correlated keywords by determining pairwise similarity values for each pair of concept signals; and grouping together temporally related semantic concepts or temporally correlated keywords based on the correlated semantic concepts or correlated keywords to determine the at least one transient topic.

In at least some embodiments, the pairwise similarity values for a given pair of concept signals is obtained by performing a cross-correlation measurement on the given pair of concept signals.

In at least some embodiments, the act of grouping together temporally related semantic concepts or temporally related keywords to determine the at least one transient topic comprises generating a concept graph which is a weighted unidirectional graph with vertices and edges, where a given vertex is one of the semantic concepts or keywords and a given edge is denoted by a pairwise similarity value of the semantic concepts or keywords associated with the given edge; and applying a graph partitioning method to extract subgraphs of the concept graph, where the semantic concepts or keywords represented by nodes in a given subgraph are combined to determine the at least one transient topic.

In at least some embodiments, prior to grouping together temporally related semantic concepts or temporally related keywords to determine the at least one transient topic, the method comprises applying filtering to remove low quality semantic concepts or low quality keywords.

In at least some embodiments, the filtering comprises identifying and removing stop concepts or stop keywords that are identified by identifying the semantic concept or keyword having a temporal frequency distribution with a similar pattern as the temporal frequency distribution of all semantic concepts or keywords in the accessed electronic content.

In at least some embodiments, the filtering comprises identifying and removing white noise concepts or white noise keywords that are identified by identifying the semantic concept having a temporal frequency distribution that follows a normal distribution within the time period.

In at least some embodiments, the act of determining the subset of the users that have similar temporal contributions to the at least one identified transient topic comprises: generating user-topic contribution signals, where a given user-topic contribution signal indicates the given user's contribution to the at least one identified transient topic for each time interval over the time period; determining an inter-similarity distance for each pair of the user-topic contribution signals; generating a weighted user graph having vertices that represent the users that have generated electronic content during the time period and edges defined by the inter-similarity distance for each pair of users; and determining at least one community of users from the weighted user graph by applying a graph partitioning method as a user community detection method.

In at least some embodiments, the method further comprises determining user communities that have partially overlapping topic interests.

In another broad aspect, at least one embodiment described herein provides a user analysis unit for determining a community of users with similar temporal behaviour from user content generated by a plurality of users, the unit comprising: a processing unit that is configured to control the operation of the user analysis unit; an input interface that is used by the processing unit to access the electronic content from a data store, the electronic content being generated by the users over a time period; a topic extractor that is configured to determine at least one transient topic from the accessed electronic content for the time period; a user community detector that is configured to determine contributions of the users to the identified at least one transient topic and determining the community of users as being a subset of the users that have similar temporal contributions to one of the at least one identified transient topic; and an output generator that is configured to provide a recommendation based on a determined user community.

In at least some embodiments, the temporal topic extractor that is configured to determine the at least one transient topic for the time period comprises modelling each transient topic as a collection of highly correlated semantic concepts or correlated keywords observed in the accessed electronic content.

In at least some embodiments, the topic extractor is configured to determine the at least one transient topic for the time period by annotating the accessed electronic content with at least one semantic concept using a semantic annotator or at least one keyword; generating a concept signal for each at least one semantic concept or at least one keyword by determining the number of times a particular semantic concept or keyword has been observed in discrete time intervals over the time period; determining correlated semantic concepts by determining pairwise similarity values for each pair of concept signals; and grouping together temporally related semantic concepts or keywords based on the correlated semantic concepts or correlated keywords to determine the at least one transient topic.

In at least some embodiments, the pairwise similarity values for a given pair of concept signals is obtained by performing a cross-correlation measurement on the given pair of concept signals.

In at least some embodiments, the topic extractor is configured to group together temporally related semantic concepts or keywords to determine the at least one transient topic by generating a concept graph which is a weighted unidirectional graph with vertices and edges, where a given vertex is one of the semantic concepts or keywords and a given edge is denoted by a pairwise similarity value of the semantic concepts or keywords associated with the given edge; and applying a graph partitioning method to extract subgraphs of the concept graph, where the semantic concepts or keywords represented by nodes in a given subgraph are combined to determine one transient topic.

In at least some embodiments, the topic extractor unit is configured to apply filtering to remove low quality semantic concepts or low quality keywords prior to grouping together temporally related semantic concepts or keywords to determine the at least one transient topic.

In at least some embodiments, the filtering is performed to identify and remove at least one of stop concepts or stop keywords and white noise concepts or white noise keywords.

In at least some embodiments, the user community detector is configured to determine the subset of the users that have similar temporal contributions by generating user-topic contribution signals, where a given user-topic contribution signal indicates the given user's contribution to the identified at least one transient topic for each time interval over the time period; determining an inter-similarity distance for each pair of the user-topic contribution signals; generating a weighted user graph having vertices that represent the users that have generated electronic content during the time period and edges defined by the inter-similarity distance for each pair of users; and determining at least one community of users from the weighted user graph by applying a graph partitioning method as a user community detection method.

In another broad aspect, at least one embodiment described herein provides a computer readable medium, comprising a plurality of instructions which, when executed on a processing unit, cause the processing unit to implement a method for determining a community of users with similar temporal behaviour from a plurality of users that generate electronic content, the method comprising: accessing electronic content generated by the users from a data store, the electronic content being transmitted by the users over a time period; determining at least one transient topic from the accessed electronic content for the time period using a topic extractor; determining contributions of the users to the at least one identified transient topic; determining the community of users as being a subset of the users that have similar temporal contributions to the at least one identified transient topic; and providing a recommendation based on a determined user community.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIGS. 6A-6C show examples of three user-topic contribution signals.

FIGS. 6D-6G show examples of semantic topics identified from user generated electronic content over an electronic medium.

Figure 1:
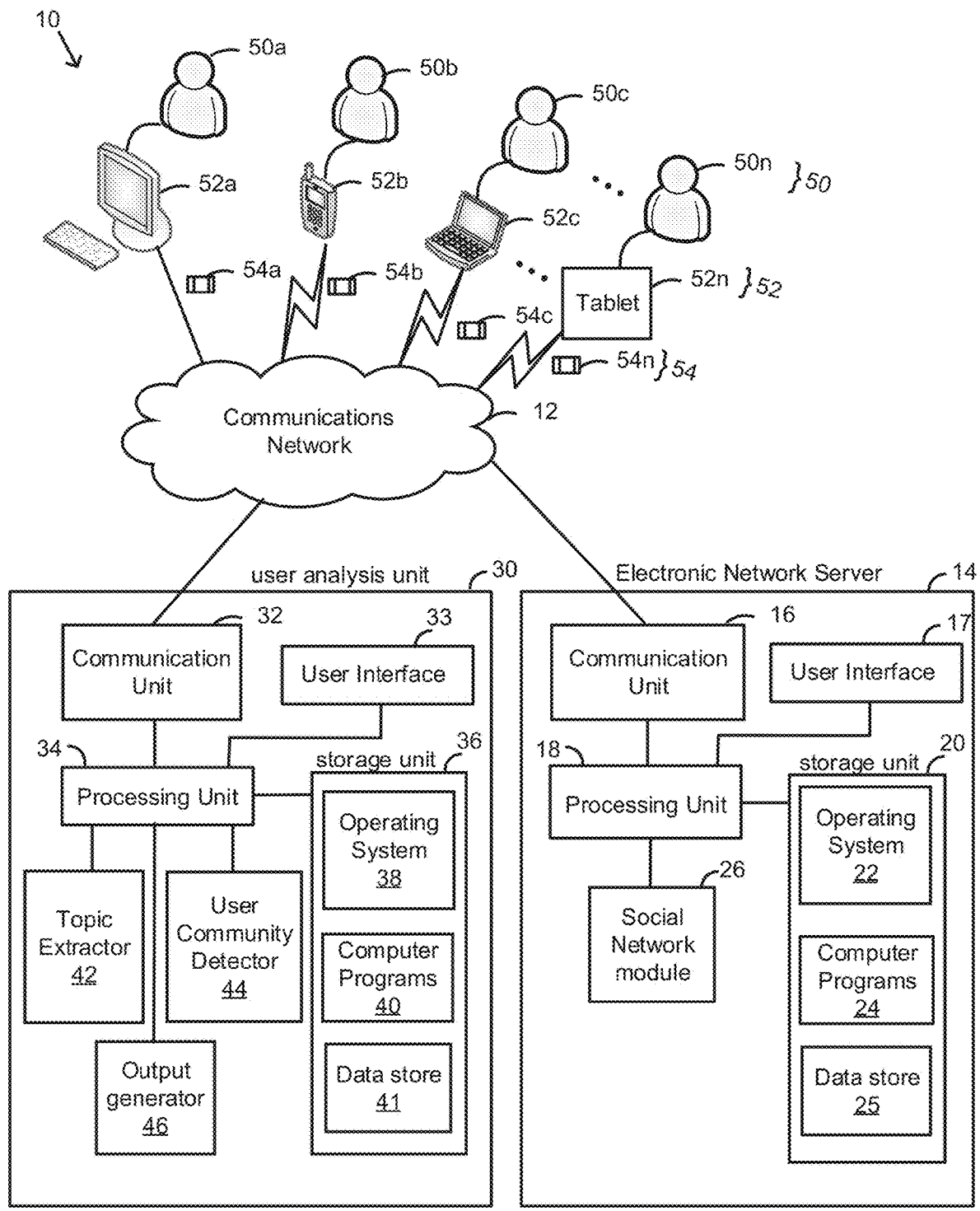
FIG. 1 is a block diagram of an example embodiment of a content analytics unit for determining users that may be conceptually and temporally related to one another over certain time periods.

Further aspects and features of the example embodiments described herein will appear from the following description taken together with the accompanying drawings.

DETAILED DESCRIPTION OF THE EMBODIMENTS

Various embodiments in accordance with the teachings herein will be described below to provide an example of at least one embodiment of the claimed subject matter. No embodiment described herein limits any claimed subject matter. The claimed subject matter is not limited to devices, systems or methods having all of the features of any one of the devices, systems or methods described below or to features common to multiple or all of the devices and or methods described herein. It is possible that there may be a device, system or method described herein that is not an embodiment of any claimed subject matter. Any subject matter that is described herein that is not claimed in this document may be the subject matter of another protective instrument, for example, a continuing patent application, and the applicants, inventors or owners do not intend to abandon, disclaim or dedicate to the public any such subject matter by its disclosure in this document.

It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling can have an electrical connotation. For example, as used herein, the terms coupled or coupling can indicate that two elements or devices can be directly connected to one another or connected to one another through one or more intermediate elements or devices via an electrical signal that can be transmitted over a physical wire or cable or transmitted wirelessly.

It should also be noted that, as used herein, the wording "and/or" is intended to represent an inclusive-or. That is, "X and/or Y" is intended to mean X or Y or both, for example. As a further example, "X, Y, and/or Z" is intended to mean X or Y or Z or any combination thereof.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation does not negate the meaning of the term it modifies.

Furthermore, the recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed, such as 5% or 10%, for example, as the case may be.

User communities that communicate over an electronic medium, such as an Intranet, the Internet, or a social network, for example, are usually identified by considering explicit structural social connections between users. While such communities can reveal important information about the users that are members of these communities such as, but not limited to, family or friendship ties and geographical proximity, just to name a few, these communities may not necessarily succeed at identifying like-minded users that share the same interests together during certain time periods.

Furthermore, there may be a link between different users who generate electronic content but do not necessarily communicate over a network. For example, there may be a set of documents that are shared by users, such as employees of an organization. In this case, the users are not directly connected by communicating over an electronic medium but a community of these users that are temporally and conceptually related can be identified by looking at the type, content and time of the documents that the users produce.

Described in accordance with the teachings herein is at least one example embodiment of a system and method that can be used for employing a temporal topic-based approach to identify latent communities of users that generate electronic content and share similar topical interests over certain time periods, regardless of whether the users are explicitly connected to each other, for example, over an electronic medium. Therefore, the users in an identified latent community share similar interests and similar temporal behavior, but do not necessarily have explicit social interaction and may be from different formally established communities or groups. For example, for users who access an electronic network that is a social media network such as Twitter, users may be formally related to one another if at least one of the users follows the other user, if one of the users favorited, liked or retweeted a post made by another user or if both users belong to a Twitter chat group. Likewise, a formal connection on the Facebook social network may include users that are friends or users that are members of the same Facebook group. As another example, a formal connection on the LinkedIn social network may be users that are connected to one another or users that are members of the same LinkedIn group. In contrast, a latent community of users, as defined and identified in accordance with the teachings herein, is a set of users that have a similar temporal inclination towards current emerging topics for messages transmitted on the electronic network regardless of whether or not the users are formally connected to one another. The identified community of users may be a community of users that has not yet been fully developed but rather is in the process of forming and is otherwise not as visible, for the time being, compared to users that are formally connected to one another. Alternatively, the identified community of users may be users that have interest in a particular subject but may never actually become explicitly connected to one another in a user community.

In accordance with the teachings herein, in at least one example embodiment, each temporal topic may be modelled using conceptual data, which may be one or more semantic annotations (i.e. Semantic Topic Extraction) or a set of one or more keywords to obtain a set of highly correlated concepts or keywords observed in the electronic content generated by the users over a given time period; these sets of concepts (i.e. semantic annotations or keywords) will be referred to as transient topics. These transient topics may be identified by applying a clustering method to time-series representations of each transient concept that is built based on each semantic concept's or keyword's observation frequency over the given time period. Based on the transient topics that are identified in the given time period, a multivariate time series analysis may be used to model the contributions of each user towards the identified transient topics, which allows for the detection of users that have a similar temporal inclination to the transient topics and define a latent user community for the transient topics for the given time period being analyzed. This may also be referred to as Topic-based Community Detection.

Figure 5:
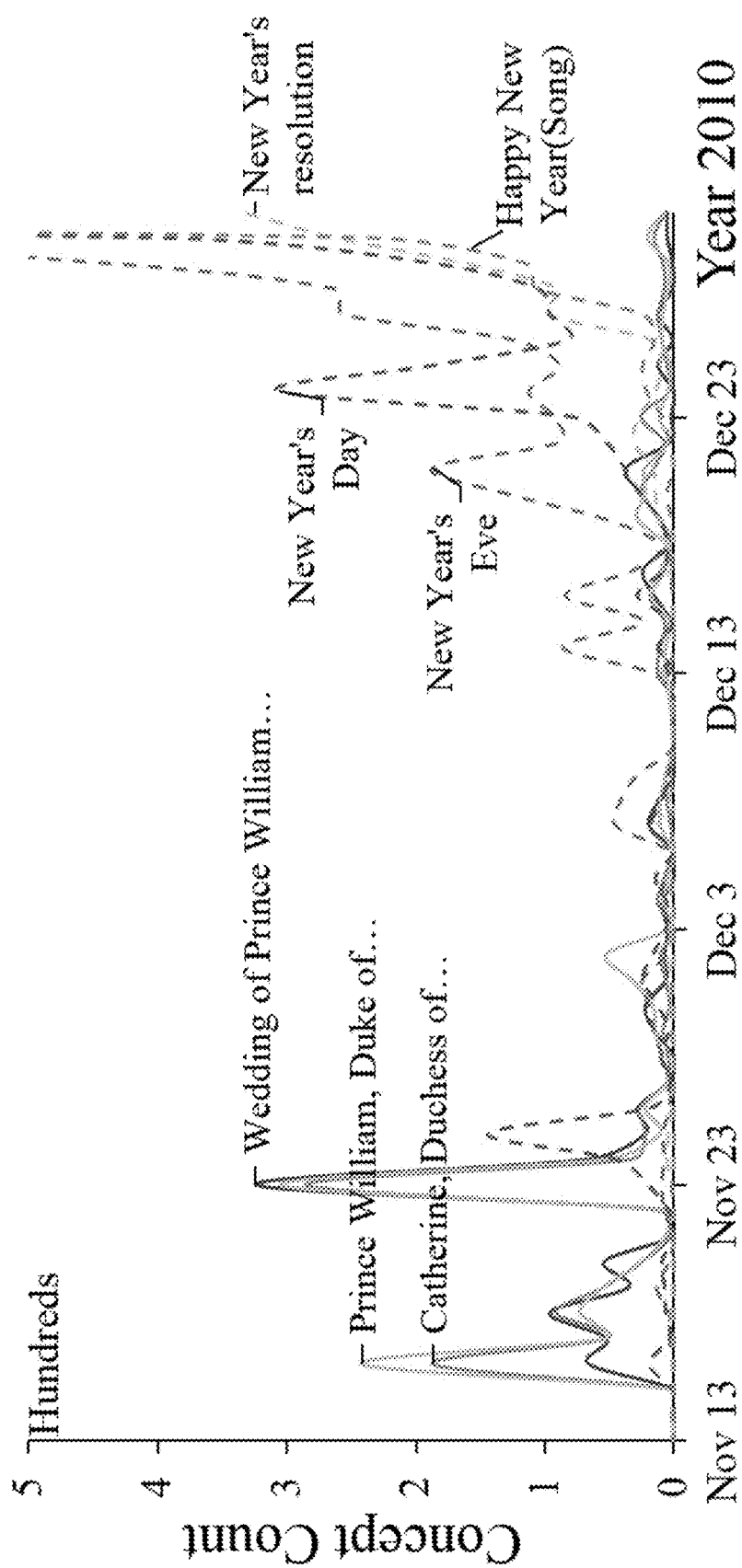
FIG. 5 shows an example of two sets of concept signals referring to two real world topics: New Year Celebrations and Prince William's Engagement.

For example, there may be an electronic medium that the users are using to communicate generated electronic content and this medium may be a social media network such as, but not limited to, Twitter and the technical problem addressed by the teachings herein is to identify temporal topic-based communities from Twitter, which are communities of Twitter users who have a similar temporal inclination towards the current transient topics on Twitter. For instance, when looking at the Twitter data in December 2010 that is shown in FIG. 5, the technical problem is to identify users that have a similar temporal behaviour to similar transient topics that can be made up of related concepts such as, the concepts New Year's Eve, New Year's resolution, New Year's Day and Happy New Year (Song) which can be combined to form a topic to represent the "New Year" event. Furthermore, another set of concepts including Catherine Duchess of Cambridge, Prince William Duke of Cambridge, and Wedding of Prince William and Catherine Middleton can be combined to form another topic to represent the "Prince William's Engagement" event and a user community can be defined based on users that have a similar temporal behaviour to these temporal topics.

In another example application of the teachings described herein, there may be a set of electronic documents that are generated by various users and the teachings herein can be used to identify users that have generated documents that have similar concepts or keywords and the times at which these documents were generated (i.e. their timestamps) are similar to one another (i.e. the documents were generated in a common time period).

In general, the user generated electronic content has a time stamp and can come in a wide variety of forms such as, but not limited to, tweets, blog posts, likes, news articles, and citations, for example.

In accordance with at least one example embodiment described herein, the transient temporal topics are first extracted or identified and then implicit latent user communities that have similar temporal dispositions with regards to these identified transient temporal topics. The latent user communities may be defined differently depending on topic and/or time period. For instance, according to the teachings herein the following types of user communities may be defined: i) a community of users who are interested in the topic "New Year" but not the other topic in the same time period; ii) a community of users who are interested in the first topic and not the second topic 'this week' (i.e. during a first time period; e.g. the first week) and iii) a community of users who have the same interest pattern as that identified for the first week but this occurs in the 'following week' (i.e. during a different time period, e.g. the second week). This can be similarly applied to other types of user generated electronic content that might not necessarily be communicated over a network that all of the users access.

According to the teachings herein, multivariate time series may be used to represent the electronic content generated by the users within a temporal multidimensional topic space whose contributions towards the identified transient topics over the given time period represent the interest of the user. Inter-user similarity may then be measured based on the similarity of the multivariate time series representation of each user. The inter-user similarity can be used to construct a graph representation of the users and their similarities. In at least one embodiment, graph partitioning and clustering methods can be used on the users' graph representation to identify implicit user communities based on the transient topics.

The technique described herein for identifying temporal topic-based user communities was quantitatively evaluated on Twitter data using three quantitative evaluation strategies including: 1) a widely used news recommendation approach that examines whether news recommendations based on temporal communities are more accurate than those based on non-temporal communities; 2) an evaluation of whether the use of temporal communities can enhance the identification of users who have posted news on a social network; and 3) a comparison of an embodiment of the teachings herein compared to existing non-temporal techniques to predict the timestamp of posted user electronic content. In addition, a qualitative assessment is made based on the types and forms of communities build using the teachings herein that shows how user communities have been separated based on their temporal inclination to transient topics using the techniques described in accordance with the teachings herein.

The example embodiments of the systems and methods described in accordance with the teachings herein may be implemented as a combination of hardware or software. Accordingly, the example embodiments described herein may be implemented, at least in part, by using one or more computer programs, executing on one or more programmable devices comprising at least one processing element, and a data store (including volatile and non-volatile memory and/or storage elements). These devices may also have at least one input device (e.g. a keyboard, mouse, a touchscreen, and the like), and at least one output device (e.g. a display screen, a printer, a wireless radio, and the like) depending on the nature of the device.

For example, and without limitation, the programmable devices may include servers, personal computers, laptops, tablets, personal data assistants (PDA), smart phones, and other suitable mobile devices. Program code can be applied to input data to perform the functions described herein and to generate output data. The output data can be supplied to one or more output devices for outputting to one or more users.

There may be some elements that are used to implement at least part of one of the embodiments described herein that may be implemented via software that is written in a high-level procedural language or object oriented programming and/or scripting language. Accordingly, the program code may be written in C, C++ or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or an interpreted language.

At least some of these software programs may be stored on a storage media (e.g. a computer readable medium such as, but not limited to, ROM, a magnetic disk, or an optical disc) or a device that is readable by a general or special purpose programmable device. The software program code, when read by the programmable device, configures the programmable device to operate in a new, specific and predefined manner in order to perform at least one of the methods described in accordance with the teachings herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. In alternative embodiments, the medium may be transitory in nature such as, but not limited to, wire-line transmissions, satellite transmissions, internet transmissions (e.g. downloads), media, digital and analog signals, and the like. The computer useable instructions may also be in various formats, including compiled and non-compiled code.

Referring now to FIG. 1, shown therein is a block diagram of an example embodiment of a user analysis unit 30 for determining users that may be conceptually and temporally related to one another based on electronic content that they generate over certain time periods. As shown in FIG. 1, the user generated electronic content may be electronic messages that are sent by a plurality of users 50 that access an electronic medium 10 through a communications network 12 over certain time periods. In this example, the plurality of users 50 includes users 50*a*, 50*b*, 50*c* and 50*n* that access the communications network 12 using a variety of electronic devices 52. The users 50 may not be formally linked or connected to one another on the electronic network 10 or otherwise. The electronic devices 52 have at least one input device (e.g. a keyboard or touchscreen, etc.) and at least one output device (e.g. a display screen, etc.). The electronic devices 52 include, but are not limited to, a desktop computer 52*a*, a smart phone 52*b*, a laptop 52, a tablet 52*n* and the like to send electronic messages 54. The electronic messages 54 comprise a variety of different types of messages or posts 54*a*, 54*b*, 54*c* to 54*n* depending on the format of the electronic network 10 (i.e. the type of social media network or internal institutional network that is provided by the electronic network 10) as will now be described.

It should be noted that in an alternative embodiment, there may not be an electronic network 10 or a communications network 12 but rather there may be repository that stores electronic content that is generated by users. In such embodiments, the user analysis unit 30 is coupled to the repository and can access the electronic content in order to determine users that share some attribute on a transient basis due to the electronic content that they generate having conceptual and temporal similarities to one another. Such users can be grouped in a transient or latent user community.

Accordingly, the teachings herein can be applied to any area that does not necessarily have a communication network but has a collection of electronic documents that are generated, produced, edited or shared by users. The users do not necessarily need to be connected to each other through an electronic network. The teachings herein can be used to identify users that work on similar projects at similar times without interacting with each other explicitly.

Referring back to FIG. 1, in this example embodiment, the electronic network 10 may be a social media network such as, but not limited to, Twitter, Facebook, and Linked n, for example. In an alternative embodiment, the electronic medium 10 may be an internal corporate messaging network. The format of the electronic messages depends on the form of the electronic medium 10. For example, if the electronic medium 10 is the Twitter network, then an electronic message may include a tweet, a user favoriting another user's tweet or a retweet of another user's tweet. If the electronic medium 10 is the LinkedIn network, then an electronic message may include a user posting a message about a topic, a user liking or commenting on another user's message, and a user joining a user community. It should be understood though that the teachings herein can be applied to other types of user generated electronic content, which may or may not be communicated over a network.

The communications network 12 can be any suitable network depending on the particular implementation of the electronic medium 10. For example, the communications network 12 may be an internal institutional network, such as a corporate network or an educational institution network, which may be implemented using a Local Area Network (LAN) or intranet. In other cases, the communications network 12 can be an external network such as the Internet or another external data communications network, which is accessible by using a web browser on the electronic devices 52 to browse one or more web pages presented over the Internet.

In some cases, some the electronic devices 52 may be wirelessly connected to an access point (e.g. a wireless router, a cellular communications tower, etc.) for the communications network 12. In other cases, some of the electronic devices 52 may be coupled via a wired connection to the communications network 12. These wired or wireless connections depend in part on the implementation of the communications network 12.

The electronic network server 14 generally includes a number of functional components for facilitating the provision of the electronic medium 10 that is accessed by the users 50 so that the users can send electronic messages 54 over the electronic medium 10. Accordingly, the electronic network server 14 comprises a communication unit 16, a user interface 17, a processing unit 18, a social network module 26 and a storage unit 20 including an operating system program 22, computer programs 24, and a data store 25. The electronic network server 14 is provided as an example and there can be other embodiments of the electronic network server 14 with different components or a different configuration of the components described herein. The electronic network server 14 further includes several power supplies (not all shown) connected to various components of the server 14 for providing power thereto as is commonly known to those skilled in the art.

The electronic network server 14 may be implemented in a variety of ways such as a desktop computer, a laptop, a mobile device or including cloud components. In some embodiments, there may be multiple network servers that work together to provision the electronic medium 10 especially in cases where there are many users 50 who access the electronic medium 10. For example, there may also be multiple backup network servers (not shown) that may duplicate some or all of the functionality provided by the electronic network server 14 and data stored on the data store 25. The backup servers may also be used to prevent undesired data loss and for data recovery in the event of a disaster such as, but not limited to, an electrical outage, a fire, a flood or theft, for example.

The communication unit 16 can be any interface that allows the electronic network server 14 to communicate with other devices or computers through the communications network 12 or another network. In some cases, the communication unit 16 can include at least one of a serial port, a parallel port or a USB port that provides USB connectivity. Additionally, or alternatively, the communication unit 16 can also include at least one of an Internet, Local Area Network (LAN), Ethernet, Firewire, modem or digital subscriber line connection. Additionally, or alternatively, the communication unit 16 may be a radio that communicates utilizing CDMA, GSM, GPRS or Bluetooth protocol according to standards such as IEEE 802.11a, 802.11b, 802.11g, or 802.11n.

The user interface 17 can be any suitable input/output device that allows a user to operate and interact with the electronic network server 14. The user interface 17 may comprise a display that provides visual information depending on the configuration of the electronic network server 14. For instance, the display can be a cathode ray tube, a flat-screen monitor, an LCD-based display and the like depending if the electronic network server 14 is a desktop computer, a laptop, or a tablet.

The user interface 17 can further include at least one of a mouse, a keyboard, a touch screen, a thumbwheel, a track-pad, a track-ball, a card-reader, voice recognition software and the like again depending on the particular implementation of the electronic network server 14. The user interface 17 may also include I/O hardware such as, but not limited to, at least one of a microphone, a speaker and a printer, for example.

The processing unit 18 controls the operation of the electronic network server 14 and can be any suitable processor, controller or digital signal processor that can provide sufficient processing power depending on the configuration and requirements of the electronic network server 14 as is known by those skilled in the art. For example, the processing unit 18 may be a high performance processor. In alternative embodiments, the processing unit 18 may include more than one processor with each processor being configured to perform different dedicated tasks. In alternative embodiments, specialized hardware can be used to provide some of the functions provided by the processing unit 18. The processing unit 18 communicates with at least one device, such as the communication unit 16 and the user interface 17, in order to receive or send information or control signals.

The storage unit 20 can include RAM, ROM, one or more hard drives, one or more flash drives or some other suitable data storage elements such as disk drives, etc. The storage unit 20 may be used to store an operating system 22, computer programs 24 and a data store 25, as is commonly known by those skilled in the art. For instance, the operating system 22 provides various basic operational processes for the electronic network server 14. The computer programs 24 include various user programs so that a user can interact with the electronic network server 14 to perform various functions such as, but not limited to, at least one of acquiring data, data analysis, adjusting parameters for controlling the operation of the electronic network 10 as well as sending and receiving messages.

The data store 25 can be configured to host data for the implementation of the electronic medium 10. For example, the data can include user profiles, news pages, group forums and provide material to be consumed by the users 50 and also allow the users 50 to comment on by sending the electronic messages 54.

The data store 25 can also be used to store one or more databases that are used to hold information for the operation of the electronic network. For example, a database may be used to store personal and contact information for the users 50. The database can also store other information required for the operation of the computer programs 24, the operating system 22 such as dynamically linked libraries and the like, or for the operation of the social network module 26. The databases can be accessed by applications that are executing on the electronic network server 14. The databases may be implemented as a relational database such as an SQL database. Additionally or alternatively, a separate computing device may host at least some portions of the storage unit 20.

The social network module 26 in cooperation with the processing unit 18 is configured to send information (e.g. HTML or other data) to be displayed on the one or more user devices 52 that are interacting with the electronic network 10 to provide an interface for the electronic medium 10 and provide a social interaction platform. As previously described, the social interaction platform may be a social media network such as, but not limited to, Twitter, LinkedIn, and Facebook or it may implement a social interaction platform such as a corporate messaging and forum system, for example. Accordingly, the social network module 26 may comprise a variety of APIs that link with other modules or subroutines to provide this functionality as is known by those skilled in the art.

Alternatively, in some embodiments the users may not be communicating over an electronic network per se, as described previously, and there is no need for the social network module 26. Accordingly, the electronic network server 14 may be a server or repository that contains electronic content that is generated by the users 50 and accessible by the user analysis unit 30.

The user analysis unit 30 is an electronic device that is used to analyze the behavior of the users 50 by accessing the electronic messages 54 that the users send over the electronic medium 10 during a given time period in order to determine common transient topics from the accessed electronic messages 54 and determine latent user communities by determining the users that have similar temporal behaviour with regards to certain common topics during the given time period. In an alternative embodiment, the user analysis unit 30 can access a data store that contains electronic content that is generated by the users 50 in order to determine common transient topics and similar temporal behaviour for users that contribute to those common transient topics in order to determine the latent user communities.

The communication unit 32, the user interface 33, the processing unit 34, the storage unit 36, the operating system program 38, the computer programs 40 and the data store 41 can be similarly implemented and therefore function generally similarly to what was described for the communication unit 16, the user interface 17, the processing unit 18, the storage unit 20, the operating system program 22, the computer programs 24 and the data store 25. Accordingly, the user analysis unit 30 may be implemented using similar components as the electronic network server 14 in addition with a topic extractor 42, a user community detector 44 and an output generator 46.

The topic extractor 42 is used to identify the main temporal topics that are associated with the electronic messages 54 being sent by the users 50 or other electronic content that is generated by the users 50 during a particular time period. The functionality and implementation of the topic extractor 42 is discussed in further detail below, for example with respect to FIGS. 2, 3 and 5 to 13.

Once the main temporal topics are identified, the user community detector 44 identifies communities of users 50 that show similar temporal behaviour to the identified transient topics but may not necessarily be formally related to one another through a connection process such as being friends on Facebook, connections on LinkedIn, followers on Twitter or sharing some other formal connection. The functionality and implementation of the user community detector 44 is discussed in further detail below, for example with respect to FIGS. 2, 4 and 5 to 13.

Once the transient topics are identified and the corresponding users that are associated with the transient topics are determined and identified as a latent user community for each transient topic, the output generator 46 can then take one or more actions depending on the nature of one of more of the electronic network 12, the users 50 and/or the identified temporal topics. The one or more actions performed by the output generator 46 can include sending electronic messages to one or more users of one or more detected latent user communities.

For example, in at least one embodiment, the user analysis unit 30 can be used to identify groups of users that share the same temporal topical interests and therefore the output generator 46 can recommend similar content to the users based on what other users that shared the same interest had shown interest in. This similar content can include, but is not limited to, news items, product recommendations, and advertising. Accordingly, for a given user, the user analysis unit 30 can determine the electronic content that was generated by other users in the implicit user group to which the given user belongs or the electronic content that these other users in the implicit user group showed interest in and provide that electronic content to the given user.

As another example, in at least one embodiment, the user analysis unit 30 can be used to predict the future topical interests that a given user will have based on the implicit user community that the given user belongs to and the behavior of other users within the same implicit user community.

In another example, in at least one embodiment, the user analysis unit 30 can be used to identify trends based on implicit user communities that have a larger number of users.

In another example, in at least one embodiment, the user analysis unit 30 can be used to identify collaboration opportunities since the implicit user communities that have been identified enable one to locate users that have shared interest and can work with one another on a particular shared interest. For example, for a corporation that has 1,000 employees, the identification of implicit user communities within that corporation allow subsets of employees to be determined who can form effective collaborations or form groups.

In alternative embodiments, the topic extractor 42, the user community detector 44 and the output generator 46 may be combined or may be separated into further modules. The topic extractor 42, the user community detector 44 and the output generator 46 are typically implemented using software. For ease of understanding, certain aspects of the methods described in accordance with the teachings herein have been described as being performed by one of the topic extractor 42, the user community detector 44 and the output generator 46 but it should be noted that these methods are not limited in that respect, and the various aspects of the methods described in accordance with the teachings herein may be performed by other modules.

Figures 2, 3, 4:
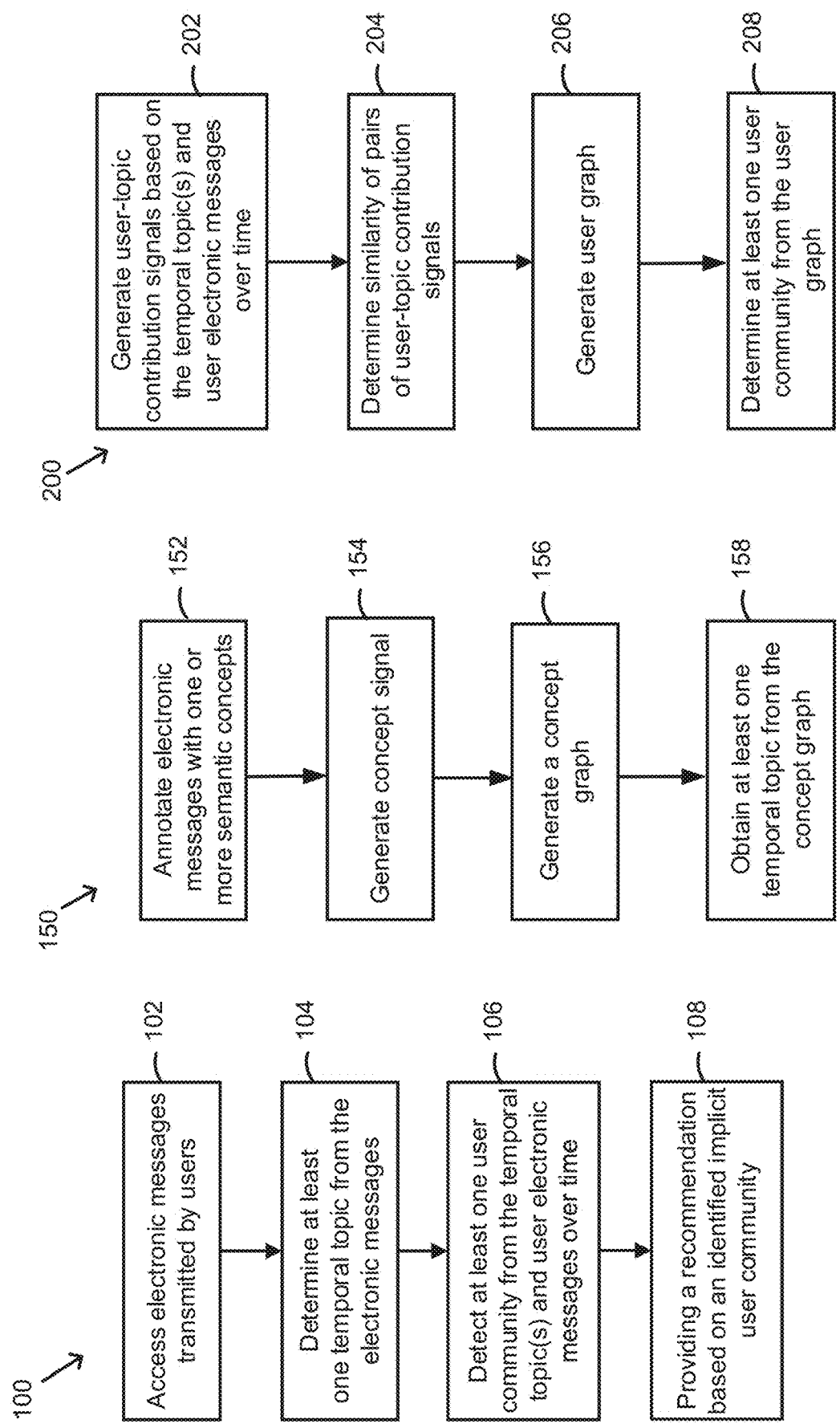
FIG. 2 is a flowchart diagram of an example embodiment of a method for determining users that may be conceptually and temporally related to one another over certain time periods.
FIG. 3 is a flowchart diagram of an example embodiment of a method for determining temporal topics from electronic content generated by users for a given time period.
FIG. 4 is a flowchart diagram of an example embodiment of a method for determining users that may be conceptually and temporally related to one another based on the temporal topics determined for the given time period.

Referring now to FIG. 2, shown therein is a flowchart diagram of an example embodiment of a method 100 for determining users that may be conceptually and temporally related to one another over certain time periods. At step 102, the user analysis unit 30 accesses electronic content generated by the users 50 for a certain time period, such as the electronic messages 54 that are transmitted by the users 50 that access the electronic medium 10. These electronic messages 54 may be accessed based on all of the user generated electronic content for a certain time period, e.g. all of the electronic messages 54 that have been sent over a certain time period over which the analysis is to be performed. The electronic messages 54 may also be accessed depending on various attributes of the users 50 who sent them.

Once the electronic messages 54 have been accessed, the topic extractor 42 processes the accessed electronic messages 54 to determine at least one temporal topic therefrom at act 104. An example embodiment of a method 150 that may be used by the topic extractor module 42 for determining the temporal topics at act 104 from the accessed electronic messages 54 for a given time period is shown in FIG. 3.

Referring now to FIG. 3, at act 152, the topic extractor 42 is configured to annotate the accessed electronic messages 54 with concepts such as semantic concepts that are defined in a source knowledge base such as DBpedia or Wikipedia/Freebase, for example, or to extract keywords which may be done a variety of ways including considering all words in the corpus, subsets of words based on frequency, discounted frequency and other ways (see http://www.worldscientific-.com/doi/abs/10.1142/S0218213004001466, for example). The topic extractor 42 may accomplish this by using a semantic annotator (Varga et al. 2014; Ferragina and Scaiella 2012). The Wikipedia/Freebase knowledge bases provide semantic descriptions of concepts and their relationships; hence and therefore can be used to obtain additional contextual information about user generated electronic content and their underlying semantics. Each accessed electronic message 54 can therefore be associated with a set of one or more semantic concepts or keywords. Users are continuously disseminating various semantic concepts or keywords through the electronic messages 54 that they send over the electronic network 12.

Once the semantic concepts or keywords have been identified at act 152, the topic extractor 42 can determine a transient topic based on a collection of temporally correlated concepts or keywords. For example, the temporal extraction module 42 may employ signal processing techniques to represent each concept or keyword's occurrence frequencies over different time intervals, by generating what is referred to as a concept signal at act 154. A concept signal indicates the number of times that a particular concept or keyword has been observed in discrete time intervals.

At act 156, temporal topics can then be generated by grouping concepts or keywords with correlated concept signals since these concepts or keywords can be considered as being conceptually related and can, therefore, collectively form a topic. One embodiment for identifying the correlated concepts or keywords that may be used by the topic extractor 42 may be to measure the pairwise temporal similarity of the identified concepts or keywords by performing a cross-correlation amongst different pairs of generated concept signals. The cross-correlation measurement involves performing a sliding inner-product over pairs of concept signals.

Still at act 156, the topic extractor 42 can then use the cross-correlation measurements to group together temporally related concepts or keywords to generate the transient topics. For example, the topic extractor 42 can generate a graph whose vertices are the observed semantic concepts or keywords and the edges denote the pairwise similarity of the source and target nodes.

At act 158, the topic extractor 42 may then identify the transient topics by applying a graph partitioning method to extract coherent induced subgraphs of the concept graph, where the topics represented by the nodes in a given subgraph can then be combined to provide the transient topic. FIGS. 6D to 6G show examples of these subgraphs.

In other words, the methodology for temporal topic identification proposed herein involves inferring fine grained users' topics of interest by viewing each topic as a conjunction of several concepts or keywords, and using graph clustering methods to extract temporally related concepts or keywords in a given time period.

Using Twitter as an example, a given tweet comprises a set of one or more semantic concepts or keywords that collectively denote the underlying semantics of the given tweet. Users are continuously sending tweets. At each point in time, a given semantic concept or keyword may be used in several different tweets posted by different Twitter users. Therefore, for any concept or keyword that has been mentioned at least once on Twitter, a time-domain signal (i.e. a concept signal) can be generated that shows the number of times that the semantic concept or keyword has been mentioned across all tweets in different time intervals over a certain time period T.

Referring again to act 154, using Twitter and tweets as an example, a concept signal for a semantic concept c or a keyword c can be represented by a temporally ordered set of integer values, expressed as $X_c=(x_1, x_2, x_L)$, from discrete observations of concept frequencies at L consecutive time intervals, such that $X_c[i]=x_i=|Tweets_c^{@}i|$, where $Tweets_c^{@}i$ represents the set of all tweets posted at time interval i.

A concept signal for a semantic concept c or a keyword c is the occurrence frequency of c within a specific time interval. Referring again to FIG. 5, shown therein are daily concept signals of two sets referring to two real world topics: New Year Celebrations and Prince William's Engagement. This example shows that concepts/keywords related to the same real world event have similar concept signal behavior.

The representation of each observed concept or keyword is through its corresponding concept signal. Therefore, two concepts or keywords are considered as being related to one another if their respective concept signals are correlated to one another. In this example embodiment, correlated concepts or keywords can be identified by the similarity of their temporal distribution, i.e., by the time behaviour of their concept signals. Concept signal correlations can be determined by measuring the similarity of their corresponding signals using cross-correlation. For example, the cross-correlation distance score of two concept signals with no time lag can be used to determine correlated concepts or keywords that exhibit simultaneous similar behaviour. This is because, if the concepts or keywords are to form a topic through their correlation, they need to exhibit similar occurrence frequency patterns simultaneously in their corresponding concept signals. The cross correlation can also be normalized to ensure that the similarity between concepts or keywords pairs is in $\Re^{[0,1]}$.

The concept correlation measure between two concepts or keywords $c_i$, $c_j$, denoted as $ccm(c_i,c_j)$, is defined as follows:

$$ccm(c_i, c_j) = \frac{X_{Ci} * X_{Cj}}{\sqrt{\sum_k (X_{Ci}^2[k]) \times \sum_k (X_{Ci}^2[k])}} \quad (1)$$

where $X_{ci}$ and $X_{cj}$ represent concept signals for concepts or keywords $c_i$ and $c_j$, respectively and $X_{Ci}*X_{Cj}$ is a measure of the cross-correlation between two concept signals calculated as:

$$X_{Ci}*X_{Cj}=\sum_{m=-\infty}^{+\infty}X_{Ci}*[m]X_{Cj}[m] \quad (2)$$

where $X_{Ci}^*$ is the complex conjugate of $X_{ci}$. Since concept signals are positive, the cross-correlation measure provides a positive output value.

Referring again to act 156 of method 100, and still continuing with Twitter and tweets as an example, a concept graph can be constructed based on the similarity of each pair of concepts or keywords based on the cross-correlation of their corresponding concept signals. The concept graph (CG) is a weighted undirected graph CG=<V,E> where V is the set of all observed semantic concepts and E is the corresponding set of cross-correlation measurements defining the edges of the CG and is defined as E={ccm($c_i$, $c_j$)|$\forall_{ci,cj}\in V$, i≠j}. Thus, the similarities of the concept signals is used as an estimate for the semantic relatedness of pairs of concepts or keywords and a weighted graph of concepts or keywords is generated based on the similarity scores of the concept signals.

The computational time complexity of building the concept graph CG is $O((_2^{|V|})\times O(L))$ where L is the length of the concept signal and L<<|V|. Thus, the time complexity can be considered to be $O(|V|^2)$ which is not practical for a graph of Twitter's scale or for another large electronic network with many electronic messages or for a large repository of user generated content. However, the computational complexity can be reduced by applying filtering steps. For example, two filtering steps can be used to screen out low quality concepts without impacting the topic extraction process. These filtering steps will significantly reduce the size of V (i.e. reduce the number of semantic concepts or keywords that are used to create the CG) and will hence make the computation of the CG practically feasible. The filtering steps include the identification and removal of uninformative concepts or keywords, including at least one of stop concepts or stop keywords and white noise concepts or keywords. The stop concept or stop keywords and white noise concepts or white noise keywords are defined and processing steps to identify and remove these concepts are described with respect to FIGS. 7 and 8.

Referring again to act 158, once the CG graph is determined, it is possible to identify highly cohesive subgraphs of the CG such that they represent the main transient topics for a given time period. Letting $CG^T=(V, E)$ be a concept graph for the time period T, a transient topic $TG=(V_{TG}, E_{TG})$ can be defined to be an induced subgraph of $CG^T$ such that $V_{TG} \subset V$ and $E_{TG}$ comprises all the edges of $CG^T$ with both end vertices in $V_{TG}$.

In order to identify all possible transient topics in $CG^T$ as just defined, a nonoverlapping community detection algorithm may be used such as the Louvain Method (LM) (Blondel et al. 2008), the k-means method, the agglomerative clustering method or any other non-overlapping clustering method to extract cohesive subgraphs of $CG^T$ each of which represent a transient topic. The Louvain method is a greedy optimization method that initially finds small communities by locally maximizing modularity and consequently performs the same procedure on the new graph by considering each community extracted in the previous step as a single vertex (Blondel et al. 2008). In testing, the standard Louvain method (i.e., the resolution parameter is set to 1) was used. It should be noted that in other embodiments, the VOS clustering method may be used since it had very similar test results as the Louvain method.

The outcome of the application of the community detection method on the concept graph CG will be the identification of coherent subgraphs of concepts or keywords where each subgraph forms a transient topic. Therefore, a set of transient topics can be generated that are each represented as a collection of highly correlated concepts or keywords.

It should be noted that in alternative embodiments, a variety of other topic detection methods may be used. For example, one graph-based and two probabilistic LDA-based approaches may be used as alternatives to extract topics from electronic content. For example, LDA based approaches (Blei et al, 2003; Hong et al., 2010; and Weng et al., 2010) can be used including the Topics over Time model (Ding, 2011).

Referring again to FIG. 2, once the transient topics are identified for the given time period, the method 100 proceeds to act 106 at which point at least one user community is detected based on their relation to the one or more identified transient topics. This is performed by the user community detector 44. This may be done by representing the degree of contribution of a user to each identified transient topic over multiple time intervals of the certain time period as a vector. Therefore, given there are multiple topics in each certain time period, each user will be represented by multiple vectors, each denoting the user's contribution towards one of the identified transient topics. Collectively, this forms a multivariate signal for each user, namely the user-topic contribution signal. Assuming there are K topics detected, a user-topic contribution signal will be a k-variate time series. A pairwise similarity between two users can be determined by determining the similarity between their corresponding user-topic contribution signals. Based on these determined similarities, a weighted graph of user similarity may be generated and graph partitioning methods can be applied to the weighted graph of user similarity to detect implicit user communities. The contribution of a user towards a topic is defined as the frequency of the topic's concepts observed in the user's set of electronic messages (i.e. the user's generated electronic content).

Referring now to FIG. 4, shown therein is a flowchart diagram of an example embodiment of a method 200 for determining users 50 that may be conceptually and temporally related to one another based the contribution of those users to the identified transient topics determined for the certain time period. In at least some embodiments, the acts of method 200 can be performed by the user community detector 44.

At act 202, user-topic contribution signals are generated based on the temporal topic(s) and the user electronic messages over the certain time. The user-topic contribution signal is a k-variate time series for a user u, denoted as $Y_u=(y_1^u, y_2^u, \ldots, y_L^u)$ for L consecutive time intervals in the given time period T. A time interval may be defined as hourly, daily or monthly and the given time period is larger than the time interval. Accordingly, if the time interval is hourly, the time period can be a certain number of days, weeks, months or years. The time interval can be determined experimentally. Then $y_t^u$ is a vector of size K=|Topics|, representing user u's contributions at time t to each of the K topics:

$$y_t^u[j]=\Sigma_{c\in j}|\text{Tweets}_c^{@t}\cap u.\text{tweets}| \quad (3)$$

where $y_t^u[j]$ denotes the contributions of user u to topic j at time interval t. Further, in the context of this example, $\text{Tweets}_c^{@t}$ represents the set of all tweets posted at time interval t that include at least one annotation referring to concept c and u.tweets refers to all tweets posted by user u.

In other words, a user-topic contribution signal shows, for each topic, how many times a given user has mentioned the concepts or keywords of that topic in her electronic messages 54 (in this example tweets but this can generally be any user generated content) within several consecutive time intervals. This can be visualized in a number of ways, such as by a heat map, for example, as shown in FIGS. 6A-6C which show three user-topic contribution signals. In this figure, the Y-axis represents the topics and the X-axis denotes the time intervals. For instance, user @VegasPhotog heavily contributed to Topic 39, represented by the concepts/keywords Hostage, Student and Teacher (referring to an event in which an armed student who burst into a high school in Wisconsin and seized a teacher and 23 students) on November 30 whereas user @anatassara did not react to this topic at all. All the three users mentioned in FIGS. 6A-6C contributed significantly to Topic 30, which is made up of the concepts/keywords New Year's Day, New Year's Resolution, New Year's Eve and Happy New Year (Song), and Tornado, but with different time delays. For instance, @GhorstWriter556 focused on Topic 30 on two specific days whereas @VegasPhotog shows an increasing trend of contribution to Topic 30 which reached its peak on Dec. 31, 2010.

The behavior of the user-topic contribution signals can be considered to be a good measure for finding the similarity between two users in that it allows temporally like-minded users to be found based on their temporally-correlated contributions to similar topics. For instance, based on FIGS. 6A-6C, the two users @VegasPhotog and @GhostWriter556 can be considered as being temporally like-minded, because not only are they interested in the Topics 9, 30 and 39, but they also share similar temporal behavior with regards to these topics (e.g., both of them have contributed to Topic 9 towards the end of December). However, the third user @anatassara can be considered to be dissimilar from the other two users because: i) she contributes to a different a topic, i.e. Topic 46, which has not received attention from the other two users; and ii) the period of time during which she reacts to Topic 9 is not completely the same as the first two users. It is noteworthy to mention that the first two users are not explicitly connected to each other on Twitter through followerships. Therefore, the users @VegasPhotog and @GhostWriter556 would not have been considered similar or placed in the same community by conventional techniques that only consider topological features of similarity.

In order to compute the similarity of a pair of user-topic contribution signals, the 2-dimensional variation of the cross correlation measure may be used. Formally, the 2D cross correlation measure of two matrices, such as $M_{K\times L}$ and $N_{K\times L}$, denoted by $XC_{[(2K-1)\times(2L-1)]}$, is determined as follows:

$$XC[i,j](M,N)=\Sigma_{k=0}^{K-1}\Sigma_{l=0}^{L-1}M[k,l]\times N^*[k-i,l-j] \quad (4)$$

where N* denotes the complex conjugate of N. Intuitively, the 2D cross-correlation measure slides one matrix over the other and sums up the multiplications of the overlapping elements. The normalized value of XC[0,0] in $\mathfrak{R}^{[0,1]}$ can be used when determining user similarity distances.

Since each user 50 is modelled through its user-topic contribution signal, which can be represented as a K×L matrix ($Y_u$), the similarity distance between two users can be determined through the 2D cross-correlation of their user-topic contribution signals without a time shift.

The inter-similarity distance of two users $u_1$ and $u_2$, denoted as $usd(u_1, u_2)$, is defined based on the 2D cross-correlation of their user-topic contribution signal as follow:

$$usd(u_1, u_2) = \frac{XC[0, 0](Y_{u1}, Y_{u2})}{(Y_{u1} \cdot Y_{u1} \times Y_{u2} \cdot Y_{u2})^{1/2}} \quad (5)$$

where $Y_u$ is the user-topic contribution signal for user u.

At act 206 of the method 200, the correlation distance may be determined between all pair of user-topic contribution multivariate signals based on the inter-similarity distance in order to build a weighted user graph, $UG^T = <V, E>$, which is a weighted undirected graph where V is the set of all users 50 that have tweeted in a specific time period T and the edges E are defined by: $E=\{usd(u_i, u_j) | \forall u_i, u_j \in V, i \neq j\}$.

At act 208 of the method 200, after constructing the user graph $UG^T$ for the given time period T, a community detection method may be used to extract clusters of users that form latent communities during the time period T. Analogous to the topic detection phase, the Louvain method may be used as a partitioning method for this purpose. A Latent User Community $LUC=(V_{LUC}, E_{LUC})$ can be defined as being an induced subgraph of $UG^T$ such that $V_{LUC} \subset V$ and $E_{LUC}$ consists of all the edges of $UG^T$ with both end vertices in $V_{LUC}$ such that $|V_{LUC}|>1$ to ensure no single user communities are permitted. In other embodiments, other methods may be used for partitioning such as the K-means method, the Minimum-cut method, the Girvan-Newman method, and the Bron-Kerbosch method.

The application of graph partitioning algorithms such as Louvain on $UG^T$ will produce latent user communities that consist of temporally like-minded users, which are not necessarily topologically connected in the electronic network 10, which in this example is the Twitter social graph, but have contributed to the same topics with the same temporal behavior and contribution degrees.

Referring once again to FIG. 2, at act 108, the method 100 comprises providing a recommendation based on an identified implicit user community. For example, the recommendation can be content (e.g. news items, product recommendations, advertising, etc.) that can be provided to a user implicit user community that is similar to content that other users in the implicit user community have shown an interest in. Alternatively, the recommendation may be to predict future topical interests or future trends for the identified implicit user community, which may be of value to companies that are looking to interact with of influence the users in the implicit user community. Alternatively, the recommendation can be to identify collaboration opportunities amongst the users in the identified implicit user community.

It should be noted that while the various methods described in accordance with the teachings herein have been described based on processing electronic messages that are generated by the users 50 and transmitted over an electronic medium, this has been done for illustrative purposes only and it should be understood that the methods described in accordance with the teachings herein can be applied to other types of electronic content that are user generated such as, but not limited to, emails, corporate memos, legal documents and other types of electronic documents, for example.

In at least some embodiments, to identify and remove uninformative concepts, two types of concepts/keywords can be modeled and identified for removal including: i) stop concepts or stop keywords and ii) white noise concepts or white noise keywords. Stop concepts/keywords are those that appear frequently regardless of context or time period and therefore removing them will not perturb topic quality. On the other hand, white noise concepts/keywords, are those that do not necessarily occur very often but their occurrence is randomly scattered through time without notable peaks.

Figure 7:
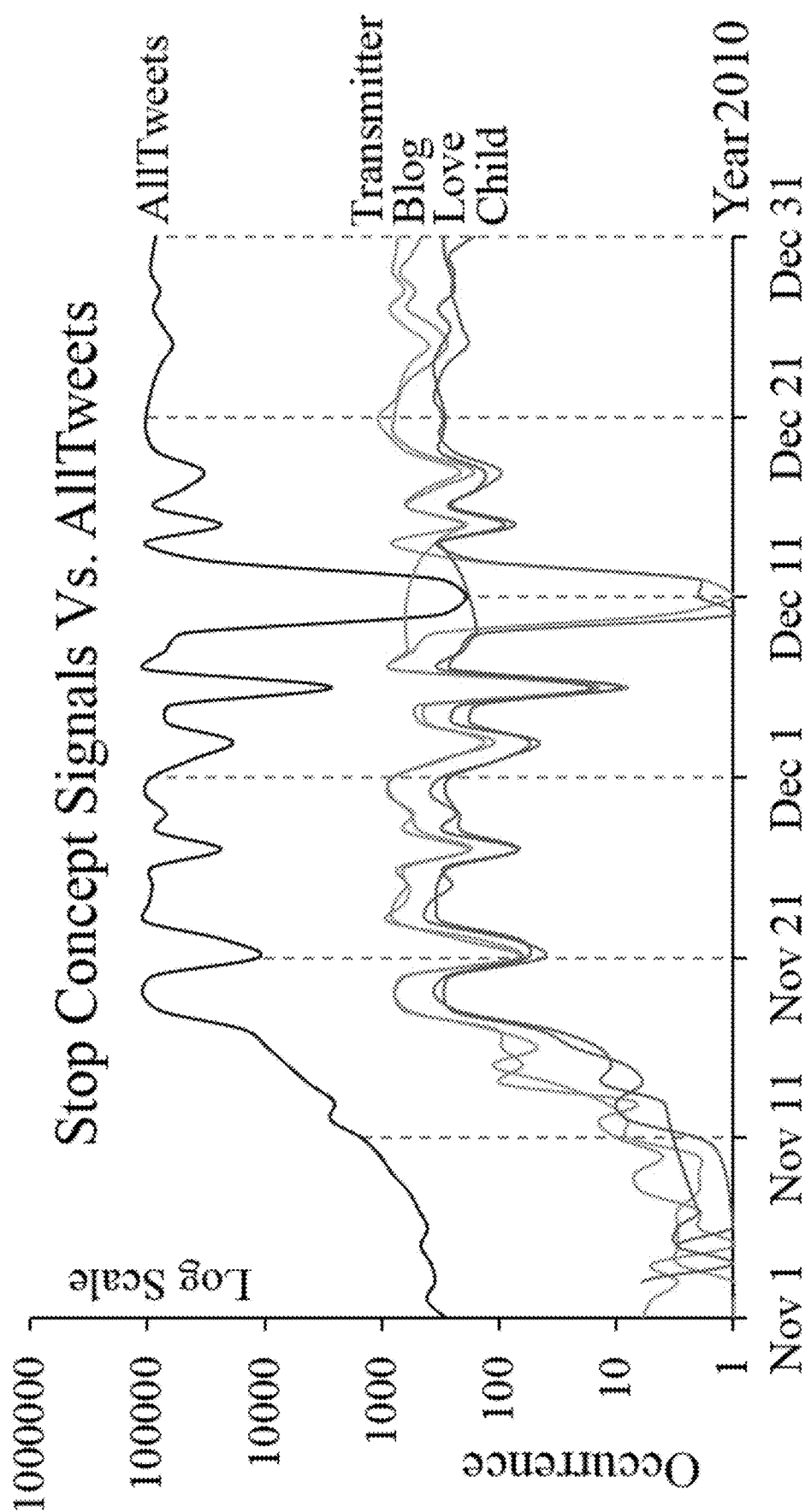
FIG. 7 is a plot showing an example of stop concept signals in comparison with the AllTweets signal.

For stop concepts/keywords, given that they are defined to be those concepts/keywords that are commonly observed and occur in many user generated electronic content, their temporal frequency distributions hence follow a similar pattern, which may be determined using cross-correlation, to the temporal distribution of the set of all concepts/keywords in the electronic content dataset. Therefore, the similarity of a given concept/keyword and the temporal distribution of all concepts collectively over time can be used as an indication for being a stop concept/keyword. In other words, the more a concept signal is similar to the total number of concepts/keywords over time (defined as the AllTweets signal in the Twitter example use case scenario), the more likely it is to be a stop concept. The AllTweets signal represents the cumulative occurrence frequency of all observed semantic concepts or keywords at L consecutive time intervals. To do so, a threshold value may be set, such as setting the threshold value to 0.9, for example, in order to ensure that stop concepts/keywords are highly correlated with the AllTweets signal. FIG. 7 depicts the behavior of some sample stop concept/keyword signals in comparison to the AllTweets signal. The stop concepts/keywords do not relate to the transient topics and can be identified and removed even before the transient topics are identified.

The intuition behind white noise concepts/keywords is that there might be many concepts that are observed within the overall timeline for user generated electronic content but their occurrence is scattered and they do not show bursty behavior at any point in time. A concept wnc can be considered to be a white noise concept/keyword if its occurrence, i.e. $X_{wnc}$, follows a normal distribution within a given time period. Formally, a white noise concept/keyword is one whose corresponding concept/keyword signal has a constant power spectral density. Provided that the power spectral density of the concept/keyword signal is a constant value, and the elements of $X_{wnc}$ have a normal distribution, the concept/keyword signal is considered to be white noise and hence can be discarded in the preprocessing phase.

Figure 8:
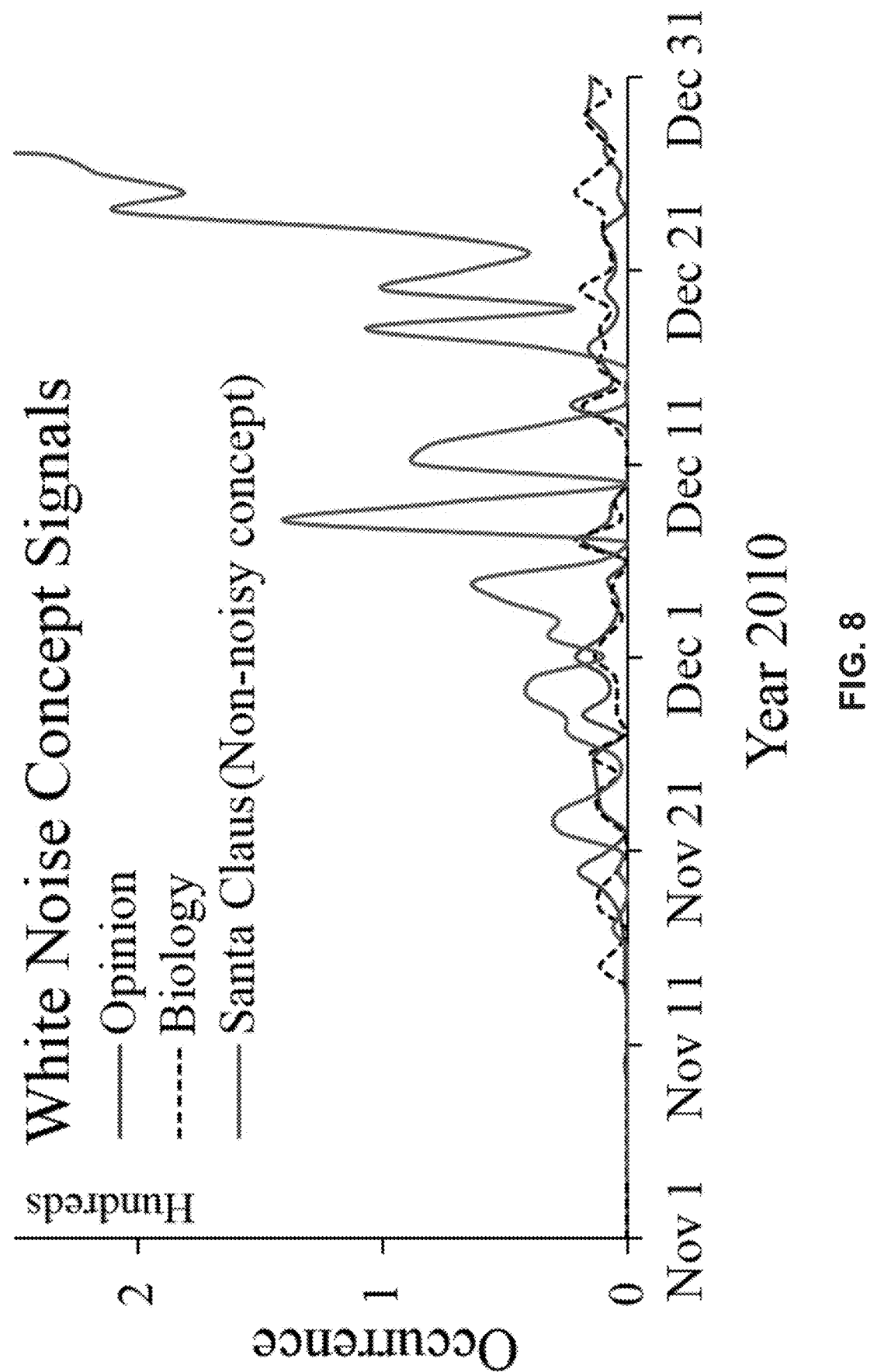
FIG. 8 is a plot showing examples of three concept signals two of which have been detected to be white noise concept/keyword signals and the third is a non-filtered concept/keyword signal (e.g. neither a stop concept/keyword signal nor a white noise concept/keyword signal).

In order to build such a white noise filter, all concept/keyword signals can be transformed into the frequency domain to obtain their power spectral density. For each concept/keyword signal, it is determined whether any harmonics exists in the frequency domain signal. The sampling rate (i.e. time resolution) that may be used for the concept/keyword signal is daily or hourly. If there are no peaks detected (i.e. there are no harmonics) in the frequency domain for a given concept/keyword signal, then it may be concluded that the given concept/keyword signal's power spectral density is relatively constant and the given concept/keyword signal can be considered to be white noise. FIG. 8 shows three concept/keyword signals two of which (Opinion and Biology) have been detected to be white noise concepts/ keywords and the third (Santa Claus) is a non-filtered concept/keyword (i.e. it is neither a stop concept/keyword nor a white noise concept/keyword).

In preprocessing, the identified stop concepts/keywords and white noise concepts/keywords are removed from the topic concept graph CG. In the Twitter data used in the experiment, these two concept filtering steps were found to significantly reduce the size of the nodes of the CG, represented by CG.V, and make the computation of the edges of the CG, represented by CG.E, quite practical. In this experiment, the number of concepts CG. V for the concept graph was reduced to 782 down from over 300,000 initial concepts.

Experiments

In this section, the experiments performed to evaluate a latent user community detection method described in accordance with the teachings herein are described in terms of the dataset, experimental setup, evaluation strategies and results. The experiments are used to determine the role and impact of temporality when building user communities. Accordingly, parameters for topic detection methods, such as the number of topics in LDA and ToT, were kept constant so as to avoid any unintended effects on the results and keep the scope of the experiments unchanged.

Dataset and Experimental Setup

In the experiments, a Twitter dataset was used which is publicly available (www.wis.ewi.tudelft.nl/umap2011) and presented by Abel et al (Abel et al. 2011). The Twitter dataset consists of approximately 3 million tweets posted by 135,731 unique users sampled between Nov. 1 and Dec. 31, 2010. Each tweet, in addition to its text, includes a user id and a timestamp.

Different topic modeling methods are applied such as LDA and ToT. LDA assumes that a document is a mixture of topics and implicitly exploits co-occurrence patterns of terms to extract sets of correlated terms as topics of a text corpus (Blei et al., 2003). Similar to (Hong et al., 2010 and Weng et al., 2010), all terms extracted from documents of a user u for each time interval t, i.e., $M_t^u$ are seen as a single document. As another LDA-based approach, the Topics over Time (ToT) model (Ding) can be used which simultaneously captures term co-occurrences and locality of those patterns over time and is hence able to discover more event-specific topics. In both LDA and ToT, z∈Z is the multinomial distribution of terms specific to topic z and the topic distribution function f is defined as a Dirichlet distribution with the parameter α; notationally, f(m)~Dir(α). After detecting topics Z from a given document collection M within a specific time period T and defining topic distribution function f using one the above topic detection methods, the next goal is to identify communities of users formed on the basis of their temporal relation to the identified topics.

Topic modeling methods such as LDA and ToT that extract topics from tweets might suffer from the sparsity problem (Cataldi et al., 2010 and Long et al., 2011) because the LDA and ToT methods are designed for regular documents and not short, noisy and informal texts like tweets. As suggested in (Varga et al., 2014), to obtain better topics from Twitter without modifying the standard topic detection methods, each tweet E M is annotated with concepts defined in Wikipedia using an existing semantic annotator. Each concept is seen as a term in the set W. For instance, for a tweet such as "Sweden issues Warrant for Wikileaks exec Julian Assange's arrest http://bit.ly/9HoOWM", a semantic annotator such as TagMe (Farragina et al., 2012) is able to identify and extract four Wikipedia concepts, namely "Sweden", "Arrest warrant", "WikiLeaks", and "Julian Assange" Using concepts instead of words can lead to the reduction of noisy content within the topic detection process, because each concept implicitly represents a collection of terms which are collectively more meaningful than a single word or a group of less coherent words (Petkos et al., 2014). The text of each tweet was annotated with Wikipedia concepts using the TagMe RESTful API (tagme.di.unipi.it/tab), which resulted in 350,731 unique concepts. The choice of TagMe was motivated by a recent study that showed this semantic annotator performed reasonably on different types of text such as tweets, queries and web pages (Comolti et al., 2013).

In order to find topics Z in the dataset, topic detection methods can be applied on the set of concepts extracted from the tweets. For example, a graph-based approach for topic detection (GbT) identifies topics by grouping a set of concepts that exhibit similar co-occurrence pattern over time in accordance with the teachings herein. Given that the Twitter dataset consists of tweets from a two month period, the pairwise similarities between daily (L=61 days) concept signals was determined. Due to the large number of identified concepts (350K), it is expensive to measure pairwise similarity through cross-correlation between all pairs of concepts. However, a large number of signals are trivial and not informative. Trivial concepts can be screened out as suggested by Weng et al., 2011 or by using the stop concept/keyword or white noise concept/keyword filtering described herein. Filtering the trivial concepts significantly reduces the number of signals down to 782 and makes the computation of concept similarities practically feasible. The remaining concepts are then clustered using the Louvain Method to form topics. About K=47 topics were found, which served as the topic set $Z_{GbT}$.

The LDA and ToT methods were also used to discover topics. The LDA-based approach to topic detection needs a priori knowledge for the number of topics, K. On the contrary, the GbT method does not require a priori information on the topic set size. Therefore, the topic set size for LDA and ToT has been selected based on the number of topics detected by the GbT method. Similar to the GbT method, daily tweets of each user are aggregated to form a single document, i.e., $M_{1 \leq t \leq 61}^u$. Then, the LDA and ToT methods were applied to the constructed documents to find topics, $Z_{LDA}$ and $Z_{ToT}$, respectively. MALLET (mallet.cs.umass.edu/topics.php) may be used to implement the LDA method. An open-source implementation is available on GitHub (github.com/ahmaurya/topics_over_time) can be used to implement the ToT method. Given the three extracted topic sets $Z_{GbT}$, $Z_{LDA}$, and $Z_{ToT}$, it can be determined whether or not the temporal approach according to the teachings herein can provide a more accurate representation of user communities compared to non-temporal communities.

Evaluation Strategies and Results

Three quantitative evaluation strategies were used for evaluating the experimental results including: 1) a widely used news recommendation approach that examines whether news recommendations based on temporal communities are more accurate than those made based on non-temporal communities; 2) an assessment of whether the use of temporal communities can enhance the identification of the users who have posted news on the social network; and 3) a comparison of the performance of the method according to the teachings herein with existing non-temporal techniques to predict the timestamp of posted tweets. Furthermore, a qualitative account of the types and forms of communities built using the method according to the teachings herein is provided which shows how communities of users have been separated based on their temporal inclination towards topics.

News Recommendation

In order to quantitatively evaluate the quality of the temporal topic-based user communities that are generated using the teachings herein, a typical news recommender application was used since several researchers (Zarrinkalam et al., 2015; Abel et al., 2011) have suggested that the performance of community detection methods can be measured through observations made at the application level such as through news recommendation. To this end, a gold standard dataset was first built by collecting news articles to which a user has explicitly linked in her tweets (or retweets). The hypothesis is that users are interested in the topics of the news article that they have posted about. Similar to tweets, news articles can be annotated with Wikipedia concepts. A news article n is a vector of N nonnegative integers, where the $i^{th}$ number shows the occurrence frequency of the $i^{th}$ concept and A is the set of all news articles. The gold standard was built from a set of tweets that included a link to news article n, posted by user u at time t. The content of each tweet was dropped and the tweet was saved as a triple (u, n, t) consisting of the news article n, user u, and the time t. Thus, $G=\{(u, n, t): u \in U, n \in A, 1 \leq t \leq L\}$ is the gold standard. It has 25,756 triples extracted from 3,468 distinct news articles posted by 1,922 users.

Given this gold standard, the objective is to see whether it is possible to recommend the right news articles to the users. A right news article n to be recommended to a user u at time t is a news article that is included in the gold standard, that is, $(u, n, t) \in G$.

The temporal topic-based user communities were built using the teachings herein for those users who have at least one triple, $U=\{u: (u, n, t) \in G\}$. A daily user topic contribution time series for such users was created, i.e., $Y^u = (y_1^u, y_2^u, \ldots, y_{L=61}^u)$ and the pairwise cross-correlation similarity on users' time series was determined. Then, a weighted graph $UG^u$ was built and the Louvain Method was applied by using its implementation from Pajek (mrvar.fdv.uni-lj.si/pajek). This produces temporal topic-based user communities $P^U$. These steps were performed for each of the topic sets $Z_{GbT}$, $Z_{LDA}$, and $Z_{ToT}$.

Non-temporal topic-based user communities were also built over the same set of users U. To do so, the daily user topic contribution time series of each user was projected to the topic space by aggregating the values over the whole time period T; formally, $y_T^u = \Sigma_{t=1}^{L=61} y_t^u$. Simply, $y_T^u$ is a vector which shows user u's degree of interest towards a set of topics in time period T. Then, the topic-based similarity of users $u_i$ and $u_j$ was determined based on the cosine similarity of their corresponding $y_T^{ui}$ and $y_T^{uj}$. Finally, a weighted graph on the users and their similarity scores was created and the Louvain Method was applied to find user communities.

Since the main objective is not to propose a news recommender application, a simple recommender algorithm (Abel el al., 2011) was adopted as follows: Given Z, the set of K topics extracted in time period T, each temporal user community $C \in P^U$ was represented by a K-variate time series, named community topic contribution time series, and denoted as $Y^C = (y_1^C, y_2^C, \ldots, (y_L^C)$ for L consecutive time intervals where $y_t^C$ represents C's contributions towards the topic set Z at time t. A community topic contribution time series was determined by aggregating the user topic contribution time series of all users who belong to user community C at each L consecutive time intervals of T, i.e., $y_t^C = \Sigma_{u \in C} y_t^u$. News article n at time t is recommended to a community C according to the cosine similarity of the topic distribution of n, f(n), and community topic contribution time series at time t.

In non-temporal communities, a user u has only $y_T^u$ which shows user u's degree of interest towards the topics in the whole time period T. A community-level degree of interest was built for the topics for each non-temporal community C, denoted as $Y_T^C$, by summing over its members' topics of interest, i.e., $Y_T^C = \Sigma_{u \in C} y_T^u$. A news article n is recommended to community C based on the cosine similarity of topic distribution of n and $Y_T^C$.

Standard information retrieval metrics were used including the Mean Reciprocal Rank (MRR) which is the inverse of the first position that a correct item occurs within the ranked recommendations and the Success at rank k (S@k) that shows the probability that at least one correct item occurs within the top-k ranked recommendations. In the following, temporal and non-temporal methods are compared in terms of MRR, S@1 and S@10.

Figure 9:
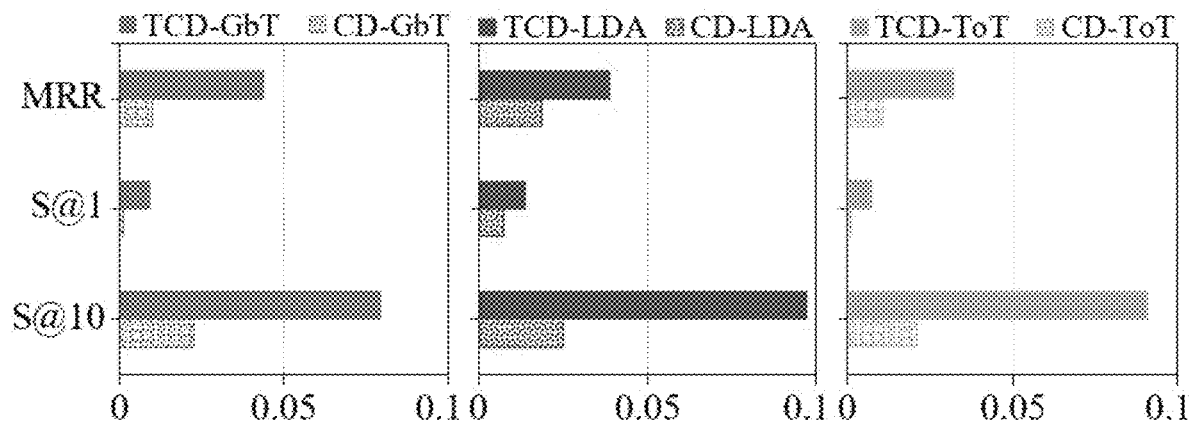
FIG. 9 shows the performance of temporal versus non-temporal community detection methods in the context of news recommendation.

Referring now to FIG. 9, the plots show that temporal user community detection method in accordance with the teachings herein using different topic detection methods, GbT, LDA, and ToT outperformed the non-temporal counterparts in all metrics. This means that incorporating temporal aspects for extracting like-minded user communities leads to more cohesive user communities that consequently results in higher quality news recommendations. It will be shown in the qualitative evaluation results section that this translates into a desirable characteristic for user communities in that users that have the same interests but in different time periods can be separated into different user communities. Advantageously this characteristic of the latent user community detection method described according to the teachings herein allows recommendations to be made at the appropriate time to users that are topically relevant.

User Prediction

From the golden standard G built in the previous section, it is already known which users post a specific news article n at time t. Based on this, given a news article n, there is interest in predicting the users who have posted this news article at a specific time. In order to identify such users, those user communities which show interest to topics of news article n at time t were determined. The hypothesis is that the user(s) who post this news article are members of such user communities. As will be shown in the results, the predictions based on non-temporal user communities do not seem to be accurate. An explanation can be that while some users may have contributed to the topics of the news article n at time t−1, they may have shifted their interest as they progressed towards time t. This dynamism in interest shift would lead to poor performance in user prediction for when using non-temporal models.

The quality of the user predictions based on the temporal approach described in accordance with the teachings herein was compared to the non-temporal user community detection approach. The results are shown in FIG. 10 for $1 \leq k \leq 100$.

Figure 10:
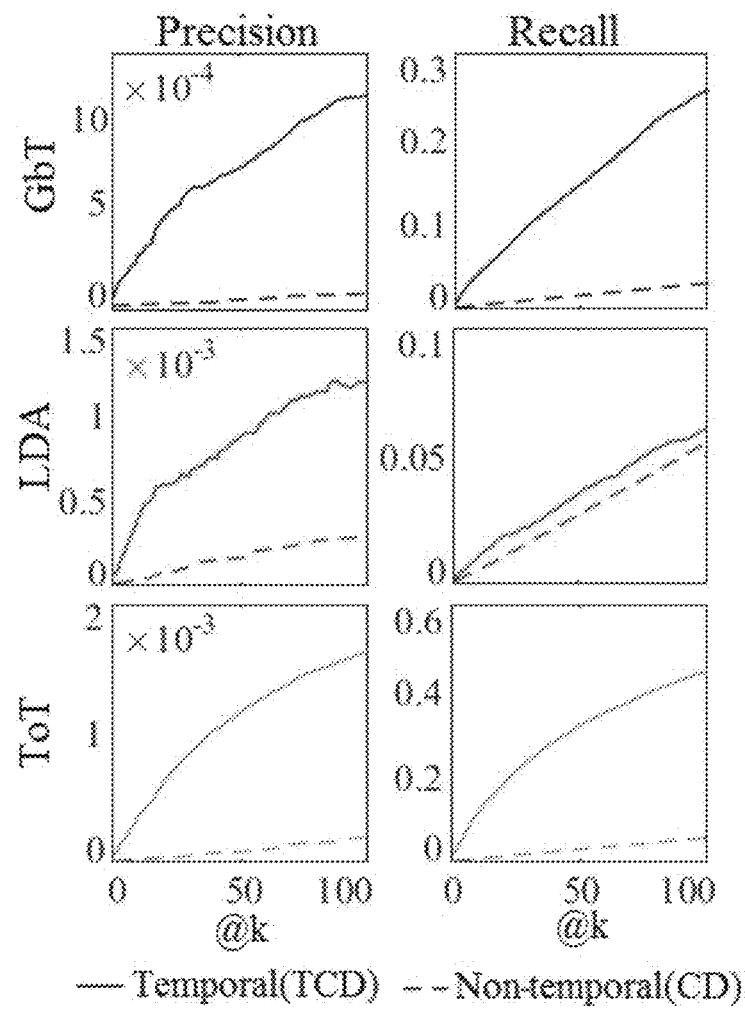
FIG. 10 shows the experimental results of the user prediction task using temporal and non-temporal topic-based community detection methods.

Referring now to FIG. 10, the plots show that the methods which use temporal user community detection (TCD) unanimously outperform the ones which use non-temporal user community detection (CD) in terms of precision and recall. This reinforces the notion that user communities that are built according to the teachings herein produce user communities that are topically and temporally coherent. Thus, when the poster of a certain news article needs to be identified at time t, both the content and time of the news can be taken into consideration, which results in more accurate predictions. However, while non-temporal user communities do consider the topic of the news article they fail to take time into account. This will result in many false positives when predicting the user because while a user may have had interest in a certain topic in previous time intervals, she may have lost interest with time and therefore naturally be much less likely to post about that topic as time passes. Given the fact that non-temporal approaches do not take time into account, they will fall short in identifying changes in user interests.

Figure 11:
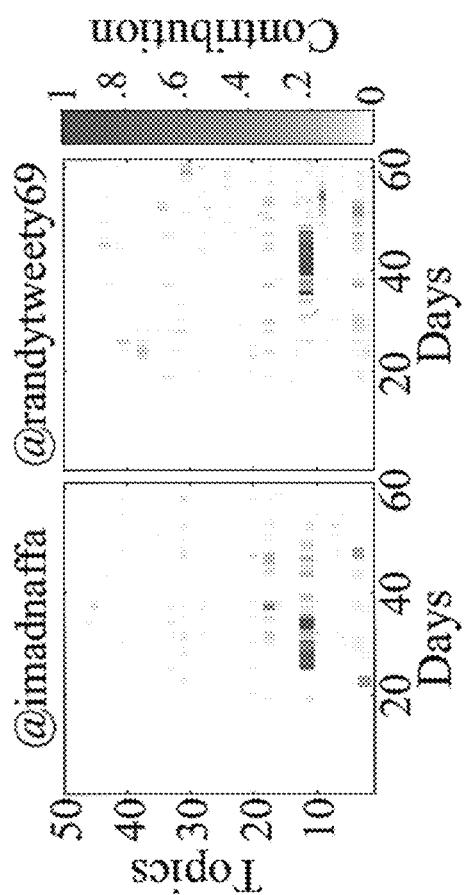
FIG. 11 shows the heatmaps of user topic contribution time series for two Twitter users.

For example, two sample Twitter users @imadnaffa and @randytweety69 can be considered to be from the same user community and therefore be considered as being likeminded using a non-temporal topic-based user community detection approach, because they are interested in the same topic, i.e., z11 (see FIG. 11). However, the user @randytweety69 can be considered to be dissimilar from the other because the period of time during which she reacts to z11 is not the same. While both users @imadnaffa and @randytweety69 are interested in the Wikileaks topic (see z11 in FIG. 13), their interest has a one week time difference. As was observed, @imadnaffa shows his interest in the topic towards late November whereas @randytweety69 did so in mid-December. Now, if a news article is observed on Twitter talking about the Wikileaks topic on December 17, it is very likely that @randytweety69 is the user who is posting this news as opposed to the other user. The same logic applies if the same news article is seen on Twitter but this time on November 25. This time the likelihood of @imadnaffa posting this news article is much higher. As it turns out in the experiments, the non-temporal user community detection methods were not able to make a distinction between the two users and hence predicted both users to be the posters in both cases. In other words, non-temporal methods determined that both users had the same likelihood of posting the news regardless of the time, leading to poor precision. However, temporal user community detection with all three variations of topic sets $Z_{GbT}$, $Z_{LDA}$ and $Z_{ToT}$ were able to identify the correct user given the time and topic of the news article.

Moreover, it was observed that the ranked list of news articles (at varying values for k) to be recommended to a temporal user community is in accordance with the user community's topics of interest in that time frame. Hence, given a user who has mentioned a news article in a time interval, it is highly probable that the temporal model will rank this news article higher in the list for that community. This leads to the production of less false negatives and higher recall. However, in non-temporal user communities, different topics of interest compete with each other only based on their topic and regardless of their temporal distribution. Imagine a community which shows interest towards a certain topic and later shifts interest towards another topic with bursty behavior. As a result of a surge of posts on the latter topic, the dominant topic for this community will be the latter topic, which would undermine the existence of the first topic. Subsequently, it would become difficult to predict users who have posted content within this community on issues related to the former topic. Therefore, more false negatives are produced and there is lower recall in non-temporal user communities.

Timestamp Prediction

Adopted from Wang et al. (2006), the temporal user communities that were generated were evaluated in terms of the capability to predict the time of that the user content was generated. To do so, given a set of extracted user communities and a triple (u, n, t)∈G, where u is a user, n is a news article, and t is the time the user posted the news article in her tweet, it is desired to predict t. For example, if the two users @imadnaffa and @randytweety69 were posting about the topic Wikileaks (z11), it is desirable to know exactly and in which time intervals they posted about it. This predicted time is referred to as $\hat{t}$. Thus, knowing u, the user community to which u belongs is first determined. Then, within the selected user community, the predicted E is when the maximum cosine similarity of the user community and the news article n happens. For temporal communities this can be done by looking at the community topic contribution time series. Formally:

$$\max_{1 \leq i \leq L} \left\{ \frac{y_i^C \cdot f(n)}{|y_i^C||f(n)|} \right\} \quad (6)$$

where • is the Euclidean dot product, $y_t^C$ is the community topic contribution vector at time t and f(n) is the topic distribution function of the corresponding topic detection method applied on the news article n. Non-temporal user communities do not have the time extension. In order to figure out when a non-temporal user community reaches its peak for a topic, as mentioned in Wang et al. (2006), a user topic contribution time series was built for its members and then the community topic contribution time series was built the same way as is done for temporal communities. Users who share similar topics but have different temporal behaviour would be members of the same non-temporal community. For instance, a non-temporal community of the two users @imadnaffa and @randytweety69 who are both interested in a topic on Wikileaks (z11) but in different time intervals, late November and mid-December, would have two peaks in the community topic contribution time series with respect to the topic z11. Therefore, there would be two possible predictions for $\hat{t}$ in the triple (@imadnaffa, n, t)∈G, where n is a news article about topic z11. Such situations lead to a poor time prediction as is shown in the experimental results.

Figure 12:
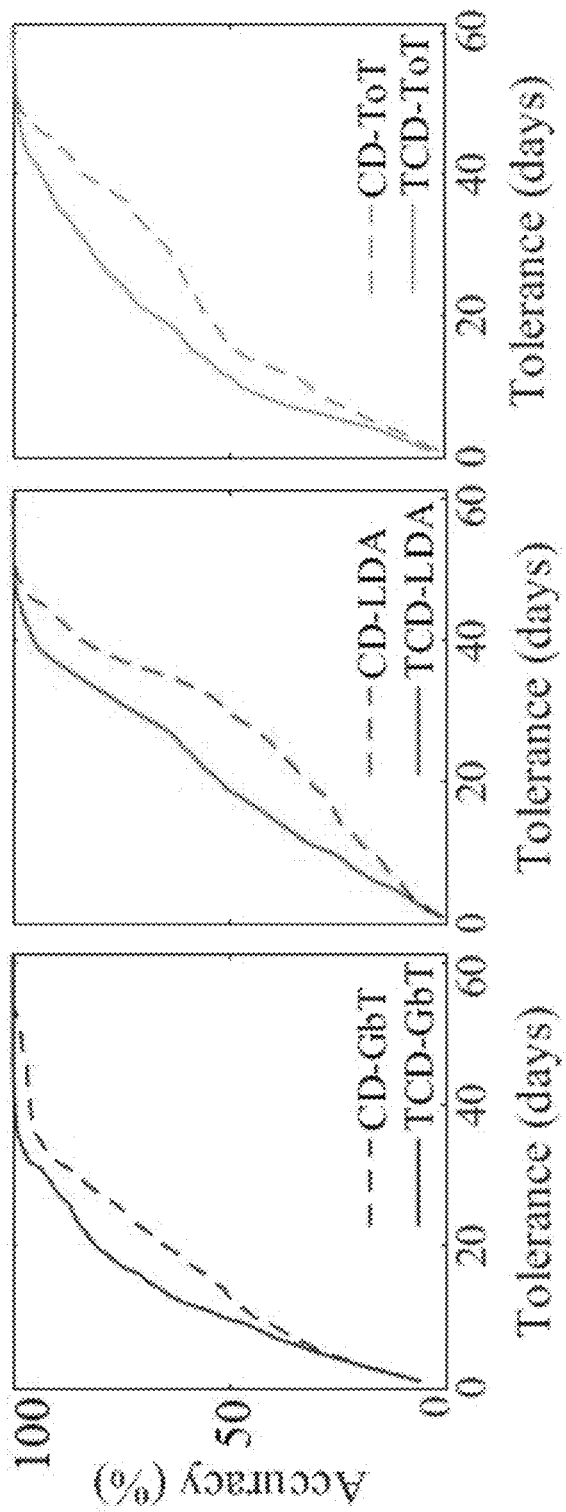
FIG. 12 shows plots of time prediction accuracy for a temporal user community detection method in accordance with the teaching herein versus non-temporal user community detection.

Referring now to FIG. 12, the plots compare temporal and non-temporal user community detection methods based on their performance in timestamp prediction. The Y-axis shows the proportion of correct time predictions when the difference between the observed time t and the predicted time $\hat{t}$ is less than the tolerance in the X-axis.

As shown, temporal user communities consistently outperform the non-temporal ones with respect to the tolerance range from perfect match, i.e., same day, to the maximum possible, i.e., L=61 days. From FIG. 12, one can see that in TCD-GbT, the time of mentions is predicted within 10 days with above 50% accuracy while there is less than 44% accuracy in the CD-GbT for the same tolerance range. Similarly, for the TCD-ToT method, we more than 47% accuracy with 10 days margin of error was achieved whereas CD-ToT achieved 31% accuracy for the same error margin. A similar pattern was also observed between the TCD-LDA and CD-LDA methods where for the tolerance of 10 days, TCD-LDA achieved 26% accuracy and CD-LDA only achieved 17% accuracy. It can be seen that regardless of the topic detection method, the temporal user communities show a noticeable improvement over the non-temporal user communities for timestamp prediction accuracy.

Qualitative Analysis

Figure 13:
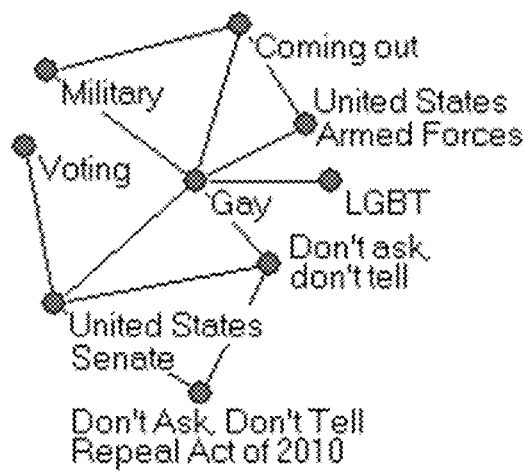
FIG. 13 shows sample transient topics that were identified using the graph-based topic detection method, in accordance with the teachings herein, which are relevant to the user communities shown in FIG. 14.
Figure 13:
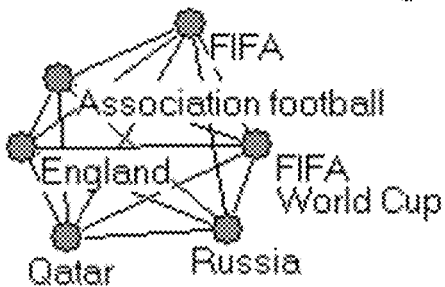
Figure 13:
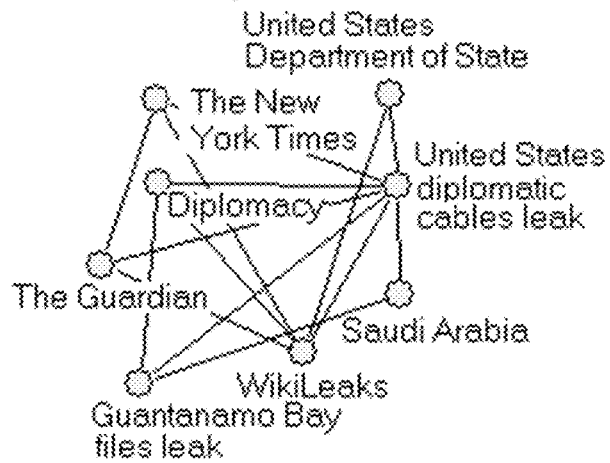
Figure 13:
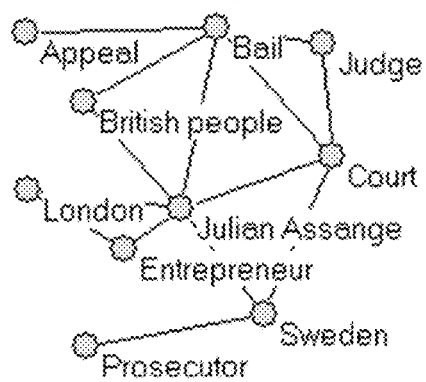
Figure 13:
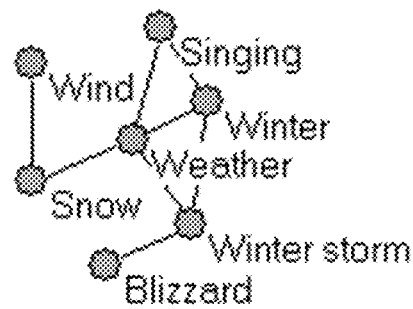
Figure 13:
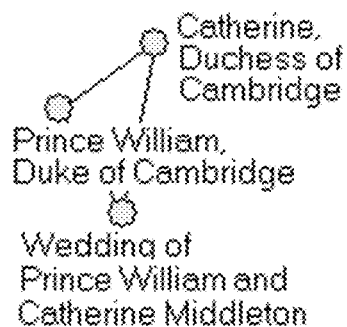
Figure 13:
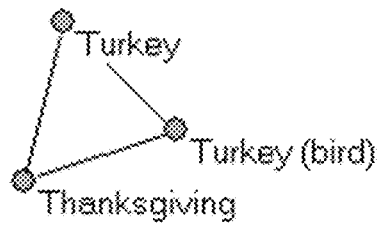
Figure 14:
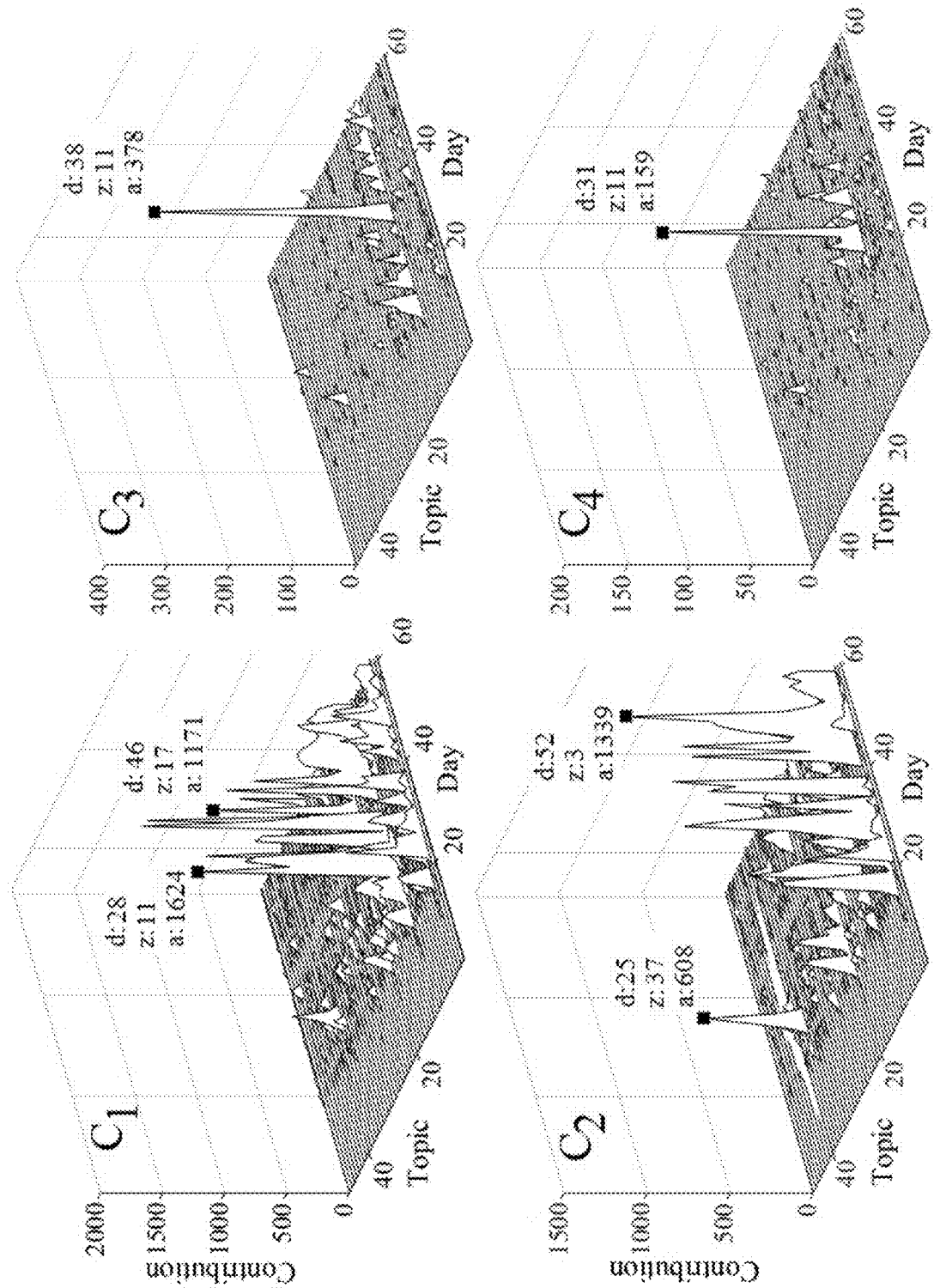
FIG. 14 shows sample temporal topic-based user communities from an experimental dataset and the relevant topics to these user communities are shown in FIG. 13 (d, z, and a denote day, topic, and contribution amplitude, respectively).

To qualitatively verify that the user communities formed using the teachings herein are based on different topics of interest to the users and on the temporality of the user contributions, the behavior of the TCD-GbT method was assessed. Some of the identified transient topics in the graph-based approach of topic detection (GbT) is shown in FIG. 13. As seen in FIG. 13, the identified transient topics represent real world events.

The temporal distribution of the topics over four of the extracted temporal topic-based user communities from using the TCD-GbT method are shown in FIG. 6. Each user community is illustrated in three dimensions of day (d), topic (z), and overall contribution amplitude (a), respectively. For instance, users in communities C1 and C2 discuss two disjoint sets of topics: Julian Assange bail (z17) and WikiLeaks (z11) in C1 and Don't Ask, Don't Tell Repeal Act of 2010 (z3) and Thanksgiving (z37) in C2. Here, the difference in topics forms different user communities. However, the users of communities C3 and C4 discuss the same topic z11 but in different time intervals (with a time delay of one week). The non-temporal user community detection approaches would merge the users of such communities (C3 and C4) into a single community. However, the temporal based approach in accordance with the teachings herein has been able to clearly distinguish between the users in these two user communities. For instance, this temporal based approach ends with user @imadnaffa in C3 and user @randytweety69 in C4. This is an important distinguishing feature for the teachings herein. For instance, considering the use case of news recommendation, it would be unreasonable to recommend a news article on topic z11 to users in C4 at day=38 (i.e. Dec. 8, 2010) at which point the users in C4 have already discussed this topic one week ago at day=31 (i.e. Dec. 1, 2010). To the contrary, it makes sense to recommend the same article to users of C3 who are actively pursuing the topic on Twitter at day=38.

At least one embodiment is provided herein to detect communities of like-minded users who share both topics of interest with similar temporal behaviour in accordance with the teachings herein. The contribution of each user towards topics may be modelled using multidimensional time series and 2-dimensional cross-correlation may be applied to such time series on a pairwise basis to find similar users in terms of topics of interest and temporal behaviour. A graph-based heuristic modularity-based partitioning algorithm such as, but not limited to the Louvain method, can then be used to create the temporal user communities. To find transient topics, state-of-the-art topic detection methods based on different approaches were used in order to show that the user community detection techniques described in accordance with the teachings herein are independent of topic detection algorithms and perform well using a variety of different topic detection methods. For example, one graph-based and two probabilistic LDA and ToT methods were used. The experimental results showed that a temporal topic-based user community detection method in accordance with the teachings herein is able to effectively identify user communities that are formed around temporally similar behavior towards shared topics. The experimental results showed that this is not possible with conventional methods.

While the applicant's teachings described herein are in conjunction with various embodiments for illustrative purposes, it is not intended that the applicant's teachings be limited to such embodiments as the embodiments described herein are intended to be examples. On the contrary, the applicant's teachings described and illustrated herein encompass various alternatives, modifications, and equivalents, without departing from the embodiments described herein, the general scope of which is defined in the appended claims.

REFERENCES

1. Abel, F.; Gao, Q.; Houben, G.; and Tao, K. 2011. Analyzing user modeling on twitter for personalized news recommendations. In UMAP'11, 1-12.
2. Blondel, V.; Guillaume, J.-L.; Lambiotte, R.; and Lefebvre, E. 2008. Fast unfolding of communities in large networks. J. Statistical Mechanics: Theory and Experiment.
3. Blei, D. M., Ng, A. Y., and Jordan, M. I. 2003. Latent dirichiet allocation. Journal of Machine Learning Research, 3:993-1022.
4. Hong, L., and Davison, B. D. 2010. Empirical study of topic modeling in twitter. In The First Workshop on Social Media Analytics.
5. Weng, J., Lim, E., Jiang, J., and He, Q. 2010. Twitterrank: finding topic-sensitive influential twitterers. In WSDM.
6. Deng, Q.; Li, Z.; Zhang, X.; and Xia. J. 2013. Interaction-based social relationship type identification in microblog. In International Workshop on Behavior and Social Informatics and Computing, 151-164.
7. Ding, Y. 2011. Community detection: Topological vs. topical. J. Informetrics, 5(4):498-514.
8. Ferragina, P., and Scaiella, U. 2012. Fast and accurate annotation of short texts with wikipedia pages. J. IEEE Software 29(1):70-75.
9. Varga, A.; Cano, E.; Rowe, M.; Ciravegna, F.; and He, Y. 2014. Linked knowledge sources for topic classification of microposts: a semantic graph-based approach. J. Web Semantics: Science, Services and Agents on the World Wide Web 26:36-57.
10. Zarrinkalam, F.; Fani, H.; Bagheri, E.; Kahani, M.; and Du, W. 2015. Semantics-enabled user interest detection from twitter. In Web Intelligence Conference.
11. Cataldi, M., Di Caro, L., and Schifanella, C., 2010, Emerging topic detection on twitter based on temporal and social terms evaluation, In International Workshop on Multimedia Data Mining.
12. Long, R., Wang, H., Chen, Y., Jin, O. and Yu, Y., 2011, Towards effective event detection, tracking and summarization on microblog data, In Web-Age Information Management.
13. Petkos, G., Papadopoulos, S., Aiello, L. M., Skraba, R., and Kompatsiaris. Y., 2014, A soft frequent pattern mining approach for textual topic detection, In WIMS.
14. Cornolti, C. M., Ferragina, P., and Ciaramita, M., 2013, A framework for benchmarking entity-annotation systems, In WWW.
15. Weng, J., and Lee, B., 2011, Event detection in twitter, In International Conference on Weblogs and Social Media.
16. Wang, X. and McCallum, A., 2006, Topics over time: a non-markov continuous-time model of topical trends, In ACM SIGKDD.

The invention claimed is:

1. A method for determining a community of users with similar temporal behaviour from a plurality of users that generate electronic content that is stored in a data store, wherein the method comprises:

accessing the electronic content from the data store using a processing unit, the electronic content being created by the plurality of users during a time period, the electronic content comprising two or more messages having different time stamps within the time period and comprising a plurality of topics;

determining at least one transient topic out of the plurality of topics from the accessed electronic content for the time period using a topic extractor based on a consideration of interactions of the plurality of users with each of the plurality of topics, where the time period comprises discrete time intervals and the time period lasts as long as the at least one transient topic is a collection of semantic concepts or keywords observed in each of the two or more messages that have a first correlation that is higher than a first correlation threshold in two or more of the discrete time intervals in the time period;

determining contributions of the plurality of users to the at least one transient topic during each of the discrete time intervals of the time period using a user community detector;

determining the community of users as being a subset of the plurality of users that have temporal contributions to one of the at least one transient topic during each of the discrete time intervals of the time period with a second correlation that is higher than a second correlation threshold using the user community detector; and providing a recommendation of an item based on the determined community of users, a topical relevance of the item to the community of users, and when the recommendation is to be provided.

2. The method of claim 1, wherein the act of determining the at least one transient topic comprises:

annotating the accessed electronic content with at least one semantic concept using a semantic annotator or extracting at least one keyword;

generating a concept signal for each at least one semantic concept or at least one keyword by determining the number of times a particular semantic concept or keyword has been observed for the discrete time intervals in the time period;

determining correlated semantic concepts or correlated keywords by determining pairwise similarity values for each pair of concept signals; and grouping together temporally related semantic concepts or temporally correlated keywords based on the correlated semantic concepts or correlated keywords to determine the at least one transient topic.

3. The method of claim 2, wherein the pairwise similarity values for a given pair of concept signals is obtained by performing a cross-correlation measurement on the given pair of concept signals.

4. The method of claim 2, wherein the act of grouping together temporally related semantic concepts or temporally related keywords to determine the at least one transient topic comprises:

generating a concept graph which is a weighted unidirectional graph with vertices and edges, where a given vertex is one of the semantic concepts or keywords and a given edge is denoted by a pairwise similarity value of the semantic concepts or keywords associated with the given edge; and applying a graph partitioning method to extract subgraphs of the concept graph, where the semantic concepts or keywords represented by nodes in a given subgraph are combined to determine the at least one transient topic.

5. The method of claim 2, wherein prior to grouping together temporally related semantic concepts or temporally related keywords to determine the at least one transient topic, the method comprises applying filtering to remove low quality semantic concepts or low quality keywords.

6. The method of claim 5, wherein the filtering comprises identifying and removing stop concepts or stop keywords that are identified by identifying the semantic concept or keyword having a temporal frequency distribution with a similar pattern as the temporal frequency distribution of all semantic concepts or keywords in the accessed electronic content.

7. The method of claim 6, wherein the filtering comprises identifying and removing white noise concepts or white noise keywords that are identified by identifying the semantic concept having a temporal frequency distribution that follows a normal distribution within the time period.

8. The method of claim 1, wherein the act of determining the community of users comprises:

generating user-topic contribution signals, where a given user-topic contribution signal indicates the given user's contribution to the at least one identified transient topic for each of the discrete time intervals over the time period;

determining an inter-similarity distance for each pair of the user-topic contribution signals;

generating a weighted user graph having vertices that represent the users that have generated electronic content during the time period and edges defined by the inter-similarity distance for each pair of users; and determining the community of users from the weighted user graph by applying a graph partitioning method as a user community detection method.

9. The method of claim 1, wherein the method further comprises determining a second community of users that has partially overlapping topic interests with the community of users.

10. The method of claim 1, wherein the topical relevance of the item to the community of users is based on a third correlation being a cosine similarity of a sum of contributions of each user of the community of users to the one of the at least one transient topic and the item.

11. The method of claim 10, wherein when the recommendation is to be provided is based on the third correlation being higher than a third correlation threshold at a particular one of the discrete time intervals of the time period.

12. A server for determining a community of users with similar temporal behaviour from electronic content generated by a plurality of users, the server being configured to:

access the electronic content from a data store, the electronic content being created by the plurality of users during a time period, the electronic content comprising two or more messages having different time stamps within the time period and comprising a plurality of topics;

execute instructions for a topic extractor that is configured to determine at least one transient topic out of the plurality of topics from the accessed electronic content for the time period based on a consideration of interactions of the plurality of users with each of the plurality of topics, where the time period comprises discrete time intervals and the time period lasts as long as the at least one transient topic is a collection of semantic concepts or keywords observed in each of the two or more messages that have a first correlation that is higher than a first correlation threshold in two or more of the discrete time intervals in the time period;

execute instructions for a user community detector that is configured to determine contributions of the plurality of users to the at least one transient topic during each of the discrete time intervals of the time period and determine the community of users as being a subset of the plurality of users that have temporal contributions to one of the at least one transient topic during each of the discrete time intervals of the time period with a second correlation that is higher than a second correlation threshold; and execute instructions for an output generator that is configured to provide a recommendation of an item based on the determined community of users, a topical relevance of the item to the community of users, and when the recommendation is to be provided.

13. The server of claim 12, wherein the topic extractor is configured to determine the at least one transient topic by annotating the accessed electronic content with at least one semantic concept using a semantic annotator or at least one keyword; generating a concept signal for each at least one semantic concept or at least one keyword by determining the number of times a particular semantic concept or keyword has been observed in the discrete time intervals over the time period; determining correlated semantic concepts by determining pairwise similarity values for each pair of concept signals; and grouping together temporally related semantic concepts or keywords based on the correlated semantic concepts or correlated keywords to determine the at least one transient topic.

14. The server of claim 13, wherein the pairwise similarity values for a given pair of concept signals is obtained by performing a cross-correlation measurement on the given pair of concept signals.

15. The server of claim 13, wherein the topic extractor is configured to group together temporally related semantic concepts or keywords to determine the at least one transient topic by generating a concept graph which is a weighted unidirectional graph with vertices and edges, where a given vertex is one of the semantic concepts or keywords and a given edge is denoted by a pairwise similarity value of the semantic concepts or keywords associated with the given edge; and applying a graph partitioning method to extract subgraphs of the concept graph, where the semantic concepts or keywords represented by nodes in a given subgraph are combined to determine one transient topic.

16. The server of claim 13, wherein the topic extractor is configured to apply filtering to remove low quality semantic concepts or low quality keywords prior to grouping together temporally related semantic concepts or keywords to determine the at least one transient topic.

17. The server of claim 16, wherein the filtering is performed to identify and remove at least one of stop concepts or stop keywords and white noise concepts or white noise keywords.

18. The server of claim 12, wherein the user community detector is configured to determine the community of users by generating user-topic contribution signals, where a given user-topic contribution signal indicates the given user's contribution to the identified at least one transient topic for each of the discrete time intervals over the time period; determining an inter-similarity distance for each pair of the user-topic contribution signals; generating a weighted user graph having vertices that represent the users that have generated electronic content during the time period and edges defined by the inter-similarity distance for each pair of users; and determining the community of users from the weighted user graph by applying a graph partitioning method as a user community detection method.

19. A non-transitory computer readable medium, comprising a plurality of instructions which, when executed on a processing unit, cause the processing unit to implement a method for determining a community of users with similar temporal behaviour from a plurality of users that generate electronic content, the method comprising:

accessing the electronic content from a data store, the electronic content being created by the plurality of users during a time period, the electronic content comprising two or more messages having different time stamps within the time period and comprising a plurality of topics;

determining at least one transient topic out of the plurality of topics from the accessed electronic content for the time period based on a consideration of interactions of the plurality of users with each of the plurality of topics, where the time period comprises discrete time intervals and the time period lasts as long as the at least one transient topic is a collection of semantic concepts or keywords observed in each of the two or more messages that have a first correlation that is higher than a first correlation threshold in two or more of the discrete time intervals in the time period;

determining contributions of the plurality of users to the at least one transient topic during each of the discrete time intervals of the time period;

determining the community of users as being a subset of the plurality of users that have temporal contributions to one of the at least one transient topic during each of the discrete time intervals of the time period with a second correlation that is higher than a second correlation threshold; and providing a recommendation of an item based on the determined community of users, a topical relevance of the item to the community of users, and when the recommendation is to be provided.

* * * * *